United States Patent
Lewis

(10) Patent No.: US 11,860,919 B2
(45) Date of Patent: Jan. 2, 2024

(54) SYSTEM AND METHOD FOR GENERATING AND OBTAINING REMOTE CLASSIFICATION OF CONDENSED LARGE-SCALE TEXT OBJECTS

(71) Applicant: Jennifer Leigh Lewis, Chicago, IL (US)

(72) Inventor: Jennifer Leigh Lewis, Chicago, IL (US)

(73) Assignee: Zelig LLC, Chicago, IL (US)

( * ) Notice: Subject to any disclaimer, the term of this patent is extended or adjusted under 35 U.S.C. 154(b) by 0 days.

(21) Appl. No.: 17/402,389

(22) Filed: Aug. 13, 2021

(65) Prior Publication Data

US 2023/0046796 A1 Feb. 16, 2023

(51) Int. Cl.
  *G06F 16/34* (2019.01)
  *G06F 40/284* (2020.01)
  *G06Q 50/26* (2012.01)
  *G06N 20/00* (2019.01)
  *G06Q 30/0217* (2023.01)

(52) U.S. Cl.
  CPC .......... *G06F 16/345* (2019.01); *G06F 40/284* (2020.01); *G06N 20/00* (2019.01); *G06Q 50/26* (2013.01); *G06Q 30/0217* (2013.01)

(58) Field of Classification Search
  CPC . G06F 16/345; G06F 40/284; G06Q 30/0217; G06Q 50/26; G06N 20/00
  See application file for complete search history.

(56) References Cited

U.S. PATENT DOCUMENTS

| | | | | |
|---|---|---|---|---|
| 8,856,127 | B2 * | 10/2014 | Davids | G06F 16/23 707/737 |
| 10,664,927 | B2 * | 5/2020 | Livshits | G06Q 50/01 |
| 11,232,358 | B1 * | 1/2022 | Ramezani | G06N 3/084 |
| 11,316,808 | B1 * | 4/2022 | Eidelman | H04L 51/52 |
| 2006/0078864 | A1 * | 4/2006 | Jorgensen | G09B 7/02 434/323 |

(Continued)

OTHER PUBLICATIONS

Rothschild et al. Are public opinion polls self-fulfilling prophecies? Research and Politics Jul.-Sep. 2014: 1-10. DOI: 10.1177/2053168014547667 (Year: 2014).*

(Continued)

*Primary Examiner* — Nicholas Ulrich
(74) *Attorney, Agent, or Firm* — Foley & Lardner LLP

(57) ABSTRACT

A system to quantify aggregate alignment of segmented text with an evaluator population, with a data processing system comprising memory and one or more processors, can segment a first extended text object into one or more evaluation text objects associated with a population reference, identify one or more text frame objects corresponding to the evaluation text objects, the text frame objects being associated with a second extended text object, generate, based on the text frame objects, one or more context identifier objects corresponding to the evaluation text objects, and generate a condensed text object including one or more of the evaluation text objects, the evaluation text objects being positioned in the condensed text object in response to output of a first machine learning model trained with input including at least one of the first extended text objects, the evaluation text objects, the context identifier objects, and the text frame objects.

15 Claims, 17 Drawing Sheets

(56) References Cited

U.S. PATENT DOCUMENTS

| | | | | |
|---|---|---|---|---|
| 2011/0219071 A1* | 9/2011 | Vogel | G06Q 50/26 | 709/204 |
| 2014/0067970 A1* | 3/2014 | Sharma | H04L 63/08 | 709/206 |
| 2014/0195897 A1* | 7/2014 | Balinsky | G06F 40/106 | 715/254 |
| 2015/0161632 A1* | 6/2015 | Humay | G06Q 30/0203 | 705/7.32 |
| 2015/0179082 A1* | 6/2015 | Byron | G09B 7/00 | 434/322 |
| 2015/0206265 A1* | 7/2015 | Tupa | G07C 13/00 | 705/7.29 |
| 2016/0232630 A1* | 8/2016 | Admon | G06Q 50/18 | |
| 2018/0075554 A1* | 3/2018 | Clark | G06F 40/47 | |
| 2018/0096552 A1* | 4/2018 | Davis | G07C 13/00 | |
| 2018/0260472 A1* | 9/2018 | Kelsey | G09B 7/02 | |
| 2020/0110801 A1* | 4/2020 | Zheng | G06N 3/0445 | |
| 2021/0383711 A1* | 12/2021 | Panuganty | H04N 1/00 | |
| 2022/0067078 A1* | 3/2022 | Fachantidis | G06Q 30/0203 | |

OTHER PUBLICATIONS

5 Calls, "Make your voice heard," retrieved from https://5calls.org/ on Jun. 15, 2021, 3 pages.
ActiVote, "Daily Democracy," retrieved from https://activote.net/ on Jun. 15, 2021, 3 pages.
App Annie, "PocketPolls," retrieved from https://www.appannie.com/en/apps/ios/app/1473498393/pocketpolls on Jun. 15, 2021, 5 pages.
Apple App Store, "Our Congress," retrieved from https://apps.apple.com/us/app/our-congress/id1299483227 on Jun. 15, 2021, 4 pages.
Capitol Call, "Call Congress with 1 Tap," retrieved from https://web.archive.org/web/20210726190558/https://www.capitolcall.org/ on Feb. 22, 2023, 4 pages.
Democracy.io, "Write to your representatives," retrieved from https://democracy.io/#!/ on Jun. 15, 2021, 2 pages.
HoneyBook, "Everything your business needs to get it done," retrieved from https://www.honeybook.com/ on Jun. 15, 2021, 11 pages.
KiraSystems, "Deepen Client Relationships. Grow Revenue. Deliver Total Diligence," retrieved from https://kirasystems.com/, retrieved on Mar. 7, 2023, 7 pages.
KwikLetter, "Mail letters to The President, US Congress, Party Leaders, Governors, and State Legislators," retrieved from https://kwikletter.com/on Jun. 15, 2021, 4 pages.
LegalSifter, "We make contracts easier," retrieved from https://web.archive.org/web/20210801114047/legalsifter.com/ on Feb. 22, 2023, 3 pages.
NDALynn, "Should you sign that document?" retrieved from https://ndalynn.com/ on Jun. 16, 2021, 6 pages.
The Tuesday Company, "VoteWithMe," retrieved from https://web.archive.org/web/20210629040326/https://votewithme.us/ on Feb. 22, 2023, 4 pages.
VoterPal, "The quickest, simplest way to register voters," retrieved from https://www.voterpal.org/on Jun. 15, 2021, 1 page.
Wikipedia, "Elway Research," retrieved from https://en.wikipedia.org/wiki/Elway_Research on Jun. 16, 2021, 2 pages.
Wikipedia, "Gallup (company)," retrieved from https://en.wikipedia.org/wiki/Gallup_(company)#Gallup_Poll, last edited on Jun. 2, 2021.
Wikipedia, "Marist Poll," retrieved from https://en.wikipedia.org/wiki/Marist_Poll, last edited on Jun. 11, 2021.
Wikipedia, "Mervin Field," retrieved from https://en.wikipedia.org/wiki/Mervin_Field, last edited on May 15, 2019.
Wikipedia, "Monmouth University Polling Institute," retrieved from https://en.wikipedia.org/wiki/Monmouth_University_Polling_Institute, last edited on Mar. 26, 2021.
Wikipedia, "Nielson ratings," retrieved from https://en.wikipedia.org/wiki/Nielsen_ratings, last edited on Jun. 9, 2021.
Wikipedia, "NORC at the University of Chicago," retrieved from https://en.wikipedia.org/wiki/NORC_at_the_University_of_Chicago, last edited on Dec. 15, 2020.
Wikipedia, "Pew Research Center," retrieved from https://en.wikipedia.org/wiki/Pew_Research_Center, last edited on May 20, 2021.
Wikipedia, "Public Policy Institute of California," retrieved from https://en.wikipedia.org/wiki/Public_Policy_Institute_of_California, last edited on May 11, 2021.
Wikipedia, "Public Policy Polling," retrieved from https://en.wikipedia.org/wiki/Public_Policy_Polling, last edited on Mar. 26, 2021.
Wikipedia, "Quinnipiac University Polling Institute," retrieved from https://en.wikipedia.org/wiki/Quinnipiac_University_Polling_Institute, last edited on Apr. 12, 2021.
Wikipedia, "Rasmussen Reports," retrieved from https://en.wikipedia.org/wiki/Rasmussen_Reports, last edited on Apr. 19, 2021.
Wikipedia, "The Harris Poll," retrieved from https://en.wikipedia.org/wiki/The_Harris_Poll, last edited on May 13, 2021.
LawGeex, "Automate Your Contract Review," retrieved from https://www.lawgeex.com/Automate Your Contract Review on Jun. 15, 2021, better version of archived web page dated Nov. 22, 2021, now "Contract Review Automation", retrieved from http://web.archive.org/web/20211122145105/https://www.lawgeex.com/ on May 17, 2023, 4 pages.
Leverton, "Data-driven decisions faster with Leverton Artificial Intelligence," retrieved from https://leverton.ai/ on Jun. 15, 2021, better version of archived web page dated Jun. 20, 2021, retrieved from http://web.archive.org/web/20210620205528/https://leverton.ai/ on May 17, 2023, 3 pages.
Quiktract, "Be Freelance," retrieved from https://quiktract.com/ on Jun. 15, 2021, better version of archived web page dated Jun. 16, 2021, now "Connect—Agree—Pay", retrieved from http://web.archive.org/web/2021061600426/https://quiktract.com/ on May 17, 2023, 8 pages.

* cited by examiner

200

| | |
|---|---|
| Text Segmenter 210 | Population Filter 240 |
| Text Frame Identifier 212 | Population Comparator 242 |
| Context Identifier 214 | Database Interface(s) 250 |
| Text Condenser 220 | Presentation Interface(s) 252 |
| Feedback Text Generator 230 | Operating System(s) 260 |
| Feedback Interface Generator 232 | |

FIG. 2

Identifiers
Surveys

I AM / AM INTERESTED IN .....

Check all that apply

| | | | |
|---|---|---|---|
| ✓ | Party | ✓ | Policies |
| ✓ | Sex | ✓ | Citizenship |
| ✓ | Religion | ✓ | Age |
| ✓ | Race | ✓ | Health Insurance |
| ✓ | Preference | ✓ | Health |
| ✓ | Home | ✓ | Pre-existing condition |
| ✓ | Location | ✓ | Employment type |
| ✓ | Relationship | ✓ | News sources |
| ✓ | Employment | ✓ | Transportation |
| ✓ | Military | ✓ | Vehicle |
| ✓ | Kids | ✓ | Grocery access |
| ✓ | Disability | ✓ | Healthcare access |
| ✓ | Education | ✓ | Debt load |
| ✓ | Income | ✓ | Debt type |
| ✓ | Biz owner | ✓ | Home energy |
| ✓ | Employee | ✓ | Languages |
| ✓ | Industry | ✓ | Public Services Use |
| ✓ | Caregiver | ✓ | Bank |
| ✓ | Investor | ✓ | Investment types |

FIG. 9

SYSTEM AND METHOD FOR GENERATING AND OBTAINING REMOTE CLASSIFICATION OF CONDENSED LARGE-SCALE TEXT OBJECTS

TECHNICAL FIELD

This technical solution relates generally to distributed computing, and more particularly to generating and obtaining remote classification of condensed large-scale text objects.

BACKGROUND

The volume of text generated by legislative action, research and debate has grown dramatically. Since the beginning of the postwar period, the Congress of the United States has enacted approximately four million to six million new words of law every two-year Congressional term. The law enacted by Congress does not include supplemental legislative text that can provide further binding language for enacted laws, including legislative analysis by Congress, and transcriptions of legislative hearings, conferences and official proceedings. Constituents and citizens are increasingly unable to understand and form educated views regarding the increasing volume of legislation proposed. In addition, representative districts are becoming increasingly more population in response to overall population growth outstripping growth in Congressional districts. Representatives and candidates are increasingly less able to understand the needs of their constituents or the views of their constituents regarding particular legislative initiatives and text. It is effectively impossible for the constituent to manually absorb the sheer volume of legislative text relevant to the constituent in a timely fashion, and to provide actionable feedback to the constituent's representative or candidate. Similarly, it is effectively impossible for the representative or candidate to manually solicit individual feedback on this massive volume of legislative text from an increasingly large pool of constituents of the representative or candidate.

SUMMARY

The systems and methods of this technical solution overcome the physical impossibility of a human manually absorbing millions of words of text and the concurrent physical impossibility of a representative manually soliciting feedback on millions of words of text from many thousands of individual constituents. The technical solution can obtain an arbitrary amount of text, including legislative text and any supporting first party and second party contextualizing, for example, text, data, and metadata, and can generate condensed summaries of that legislative text matching one or more identity, interest, or like criteria for an arbitrary number of constituents of, for example, a particular geography, jurisdiction, community group, demographic group, or electoral group, based on a machine learning model or system. These condensed text objects can include summaries of particular legislative text generated based on the legislative text itself and positioned into, for example, a snippet, sentence, paragraph, phrase, or question, based on a machine learning model or system. The technology can generate a feedback object including, for example a survey question, to solicit constituent feedback on a particular issue as generated into a condensed summary for constituent feedback. Thus, the technology can automatically generate concise survey questions regarding any portions of a body of legislative text of any size and directly relevant to an individual constituent, can transmit those questions to remote devices of an arbitrary number of constituents, and can receive substantially real-time feedback from those constituents through their remote devices. The technology can aggregate responses received from the mobile devices to generate aggregate levels of constituent support for particular legislate text and issues, for example, and to generate comparative metrics of positions by a representative or candidate, for example, with respect to a pool of constituents responding to the survey. Thus, a technological solution for generating and obtaining remote classification of condensed large-scale text objects is provided.

Example implementations include a system to quantify aggregate alignment of segmented text with an evaluator population, with a data processing system including memory and one or more processors to segment a first extended text object into one or more evaluation text objects associated with a population reference, identify one or more text frame objects corresponding to the evaluation text objects, the text frame objects being associated with a second extended text object, generate, based on the text frame objects, one or more context identifier objects corresponding to the evaluation text objects, and generate a condensed text object including one or more of the evaluation text objects, the evaluation text objects being positioned in the condensed text object in response to output of a first machine learning model trained with input including at least one of the first extended text objects, the evaluation text objects, the context identifier objects, and the text frame objects.

The system can generate a feedback object including the condensed text object and a response interface object, the feedback object corresponding to an output of a second machine learning model trained with input including at least one of the first extended text objects, the evaluation text objects, the context identifier objects, and the text frame objects.

The system can transmit the feedback object to a population user device operatively coupled with the data processing system and associated with a first member of the population reference.

The system can obtain one or more population classification objects from the response interface object corresponding to the population user device.

The system can generate a population metric associated with the condensed text object and based on one or more population classification objects corresponding to the population reference.

The system can generate a representative metric associated with the condensed text object and based on one or more representative classification objects corresponding to a second member of the population reference.

The system can generate a comparative metric indicating a quantitative agreement between the population metric and the representative metric.

The system can present, at a representative user device operatively coupled with the data processing system and associated with the first member, and in response to a determination that the comparative metric satisfies an agreement threshold, an indication that the comparative metric satisfies the agreement threshold.

In the system, the first extended text object, the second extended text object, and the condensed text object can include natural language text satisfying a document length threshold.

Example implementations include a method to quantify aggregate alignment of segmented text with an evaluator population, by segmenting, by a data processing system including one or more processors, a first extended text object into one or more evaluation text objects associated with a population reference, identifying, by the data processing system, one or more text frame objects corresponding to the evaluation text objects, the text frame objects being associated with a second extended text object, generating, by the data processing system and based on the text frame objects, one or more context identifier objects corresponding to the evaluation text objects, and generating, by the data processing system, a condensed text object including one or more of the evaluation text objects, the evaluation text objects being positioned in the condensed text object in response to output of a first machine learning model trained with input including at least one of the first extended text objects, the evaluation text objects, the context identifier objects, and the text frame objects.

The method can include generating, by the data processing system, a feedback object including the condensed text object and a response interface object, the feedback object corresponding to an output of a second machine learning model trained with input including at least one of the first extended text objects, the evaluation text objects, the context identifier objects, and the text frame objects.

The method can include transmitting, by the data processing system, the feedback object to a population user device operatively coupled with the data processing system and associated with a first member of the population reference.

The method can include obtaining, by the data processing system and, one or more population classification objects from the response interface object corresponding to the population user device.

The method can include generating, by the data processing system, a population metric associated with the condensed text object and based on one or more population classification objects corresponding to the population reference.

The method can include generating, by the data processing system, a representative metric associated with the condensed text object and based on one or more representative classification objects corresponding to a second member of the population reference.

The method can include generating, by the data processing system, a comparative metric indicating a quantitative agreement between the population metric and the representative metric.

The method can include executing, by the data processing system, at least one instruction to present, at a representative user device operatively coupled with the data processing system and associated with the first member, and in response to a determination that the comparative metric satisfies an agreement threshold, an indication that the comparative metric satisfies the agreement threshold.

In the method, the first extended text object, the second extended text object, and the condensed text object can include natural language text satisfying a document length threshold.

Example implementations include a computer readable medium with one or more instructions stored thereon and executable by a processor to segment, by the processor, a first extended text object into one or more evaluation text objects associated with a population reference, identify, by the processor, one or more text frame objects corresponding to the evaluation text objects, the text frame objects being associated with a second extended text object, generate, by the processor and based on the text frame objects, one or more context identifier objects corresponding to the evaluation text objects, and generate, by the processor, a condensed text object including one or more of the evaluation text objects, the evaluation text objects being positioned in the condensed text object in response to output of a first machine learning model trained with input including at least one of the first extended text objects, the evaluation text objects, the context identifier objects, and the text frame objects, transmit, by the processor via a communication interface to a population user device operatively coupled with the processor and associated with a first member of the population reference, the feedback object to the population user device, obtain, by the processor via the communication interface from a population user device, one or more population classification objects from the response interface object, and generate, by the processor, a population metric associated with the condensed text object and based on one or more of the population classification objects.

The computer readable medium can include one or more instructions executable by a processor to generate, by the processor, a representative metric associated with the condensed text object and based on one or more representative classification objects corresponding to a second member of the population reference, generate, by the processor, a comparative metric indicating a quantitative agreement between the population metric and the representative metric, and execute, by the processor, at least one instruction to present, at a representative user device operatively coupled with the data processing system and associated with the first member, and in response to a determination that the comparative metric satisfies an agreement threshold, an indication that the comparative metric satisfies the agreement threshold.

BRIEF DESCRIPTION OF THE DRAWINGS

These and other aspects and features of the present implementations will become apparent to those ordinarily skilled in the art upon review of the following description of specific implementations in conjunction with the accompanying figures, wherein:

FIG. 2 illustrates an example system memory architecture further to the example system of FIG. 1.

FIG. 9 illustrates an example constituent identifier user interface executable on a remote device, in accordance with present implementations.

DETAILED DESCRIPTION

Figure 1:
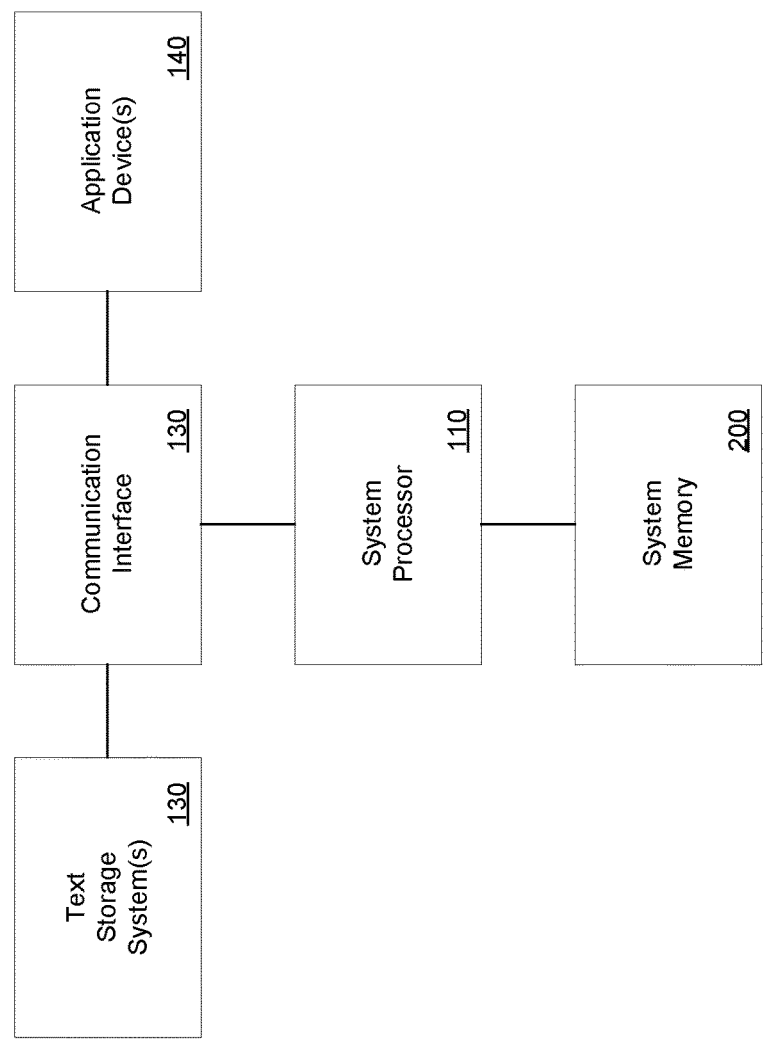
FIG. 1 illustrates an example system, in accordance with present implementations.

This technical solution is now described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

This technical solution is directed at least to condensing large-scale text objects into smaller condensed text objects consumable by individuals. Large-scale text objects can include legislative text, including legislation, and can include associated text objects associated with and external to the legislative text. For example, the associated text objects can include congressional research, analysis, scoring, for example and can also include congressional records and transcripts, for examples, associated with hearings, conferences, committee proceedings, or judicial references, for example. These sources of text are too voluminous for an individual to manually consume, and thus a technological solution is required to condense the large-scale text objects into one or more smaller condensed text objects. To achieve this technological solution, present implementations can at least obtain the above-noted text through one or more machine learning engines to generate the condensed text objects otherwise impossible to generate manually. Specifically, present implementations can include technological solutions of one or more machine learning systems trainable with the above-noted text and derivatives thereof, distributed computing interfaces connectable with particular constituents, and one or more presentation interfaces operable to transmit and obtain feedback objects. Present implementations can thus provide a practical application by those technological solutions of a substantially real-time feedback system for large-scale text objects across a distributed network interface to an arbitrary number of distributed users or remote users, for example.

FIG. 1 illustrates an example system, in accordance with implementations. As illustrated by way of example in FIG. 1, an example system 100 includes a system processor 110, a system memory 200, a communication interface 130, one or more text storage systems 130, and one or more application devices 140.

The system processor 110 can execute one or more instructions associated with input from at least one of the system memory 200 and the communication interface 130. The system processor 110 can include an electronic processor, an integrated circuit, or the like including one or more of digital logic, analog logic, digital sensors, analog sensors, communication buses, volatile memory, nonvolatile memory, and the like. The system processor 110 can include, but is not limited to, at least one microcontroller unit (MCU), microprocessor unit (MPU), central processing unit (CPU), graphics processing unit (GPU), physics processing unit (PPU), embedded controller (EC), or the like. The system processor 110 can include a memory operable to store or storing one or more instructions for operating components of the system processor 110 and operating components operably coupled to the system processor 110. The one or more instructions can include at least one of firmware, software, hardware, operating systems, embedded operating systems, and the like. The system processor 110 or the system 110 generally can include at least one communication bus controller to effect communication between the system processor 110 and the other elements of the system 110.

The system memory 200 can store data associated with the system 100. The system memory 200 can include one or more hardware memory devices for storing binary data, digital data, or the like. The system memory 200 can include one or more electrical components, electronic components, programmable electronic components, reprogrammable electronic components, integrated circuits, semiconductor devices, flip flops, arithmetic units, or the like. The system memory 200 can include at least one of a non-volatile memory device, a solid-state memory device, a flash memory device, and a NAND memory device. The system memory 200 can include one or more addressable memory regions disposed on one or more physical memory arrays. A physical memory array can include a NAND gate array disposed on, for example, at least one of a particular semiconductor device, integrated circuit device, and printed circuit board device.

The communication interface 130 can communicatively couple the system processor 130 to an external device. An external device can include, but is not limited to, a smart-phone, mobile device, wearable mobile device, tablet computer, desktop computer, laptop computer, cloud server, local server. The communication interface 130 can communicate one or more instructions, signals, conditions, states, or the like between one or more of the system processor 110 and components, devices, blocks operatively coupled or couplable therewith. The communication interface 130 can include one or more digital, analog, or like communication channels, lines, traces, or the like. As one example, the communication interface 130 can include at least one serial or parallel communication line among multiple communication lines of a communication interface. The communication interface 130 can include one or more wireless communication devices, systems, protocols, interfaces, or the like. The communication interface 130 can include one or more logical or electronic devices including but not limited to integrated circuits, logic gates, flip flops, gate arrays, programmable gate arrays, and the like. The communication interface 130 can include ones or more telecommunication devices including but not limited to antennas, transceivers, packetizers, and wired interface ports. Any electrical, electronic, or like devices, or components associated with the communication interface 130 can also be associated with, integrated with, integrable with, replaced by, supplemented by, complemented by, or the like, the system processor 110 or any component thereof.

The text storage systems 130 can store data associated with one or more external systems, remote systems, and third party systems, for example. The text storage systems 130 can include one or more hardware memory devices for storing binary data, digital data, or the like. The text storage systems 130 can include one or more independent databases, data centers, computer networks, public networks, cloud networks, or enterprise networks, for example. Various text storage systems 130 among the text storage systems 130 can, for example, include government, public, university, and private storage systems. As one example, the text storage systems 130 can include a Congressional legislation database or a Congressional legislative analysis database. As another example, the text storage systems 130 can include a Congressional legislative research database, a third party legislative research database, or a third party legislative analysis database. Text of the text storage systems can include natural language text, including but not limited to English language text. The text can be structured as ASCII or binary-coded text, for example. The text can include annotations, metadata, or pointers to external text or non-text data, for example. The text storage systems 130 can include one or more electrical components, electronic components, programmable electronic components, reprogrammable electronic components, integrated circuits, semiconductor devices, flip flops, arithmetic units, or the like. The text storage systems 130 can include at least one of a non-volatile memory device, a solid-state memory device, a flash memory device, and a NAND memory device. The text storage systems 130 can include one or more addressable memory regions disposed on one or more physical memory arrays. A physical memory array can include a NAND gate array disposed on, for example, at least one of a particular semiconductor device, integrated circuit device, and printed circuit board device.

The application devices 140 can include remote devices or personal computing devices, for example, and can be operatively couplable to the system processor 110 by the communication interface 130. The application devices 140 can include, for example, smartphones, tablets, desktop computers, notebook computers, smart watches, and wearable devices, for example. Each of the application devices 140 can include a mobile application, application programming interface (API), network interface, or communication interface, for example, that can present one or more communications, by the communication interface 130, from the system processor 110 and transmit, by the communication interface 130, one or more communications to the system processor 110.

FIG. 2 illustrates an example system memory architecture further to the example system of FIG. 1. As illustrated by way of example in FIG. 2, an example system memory architecture 200 includes a text segmenter 210, a text frame identifier 212, a context identifier 214, a text condenser 220, a feedback text generator 230, a feedback interface generator 232, a population filter 240, a population comparator 242, one or more database interfaces 250, one or more presentation interfaces 252, and an operating system 260. Components of the system memory architecture 200 can include one or more logical or electronic devices including but not limited to integrated circuits, logic gates, flip flops, gate arrays, programmable gate arrays, and the like. It is to be understood that any electrical, electronic, or like devices, or components associated with components of the system memory architecture 200 can be associated with, integrated with, integrable with, replaced by, supplemented by, complemented by, or the like, the system memory 200 or any component thereof.

The text segmenter 210 can include one or more instructions to segment, separate, divide, or parse, for example, text received thereat. The received text can include a legislative text, including any extended text object. The text segmenters can include a natural language processor (NLP) operable to segment the received text into one or more text fragments or blocks, for example. Each text fragment or block can be associated with a text identifier. The text identifier can be associated with a part of speech, a type of phrase, or an external descriptor, for example. A part of speech can include a noun, verb, adjective, adverb, article, or other grammatical construct, for example. The type of phrase can include a phrase, sentence, paragraph, subject, or predicate, for example. The text segmenter 210 can thus generate at least one array, vector, or text object, for example, including one or more segments of the received text and their associated text identifiers. The text segmenter 210 can thus achieve the practical application of applying text identifiers to a received text of arbitrary length, including thousands of pages in length or more, that would otherwise be impossible to complete manually in a sufficient time period to allow user feedback before the close of the legislative process relating to that received text.

The text frame identifier 212 can identify one or more text fragments or blocks in the segmented text object satisfying one or more population criteria. The population criteria can include predetermined words, statements, or phrases, for example, associated with a population reference, or a member of a population reference, for example. The population reference can include a particular location, jurisdiction, geography, demographic, or the like, for example, for one or more people or constituents associated with the population reference, for example. The text frame identifier 212 can execute a search instruction for one or more predetermined text strings or blocks, for example, within the segmented text object. The predetermined text strings can include, for example, "family," "household," "community," "parent," "child," "children," "school," "education," "care," "prescription," and the like. The predetermined text strings can also be generated by an automated process to extract text strings or the like having correlation to one or more members or groups of members of the population reference, or to one or more population references in a largest superset of population references. The largest superset can be a largest jurisdiction containing or associated with the population reference. As one example, the largest superset can be the United States. The text frame identifier 212 can identify text based on the content of the text and any text identifier associated therewith, so as to correctly identify words with different meaning and identical or similar spelling. The text frame identifier 212 can thus achieve the practical application of identifying population-relevant text fragments within a received text of arbitrary length, including thousands of pages in length or more, that would otherwise be impossible to complete manually in a sufficient time period to allow user feedback before the close of the legislative process relating to that received text.

The context identifier 214 can associate one or more external text objects with one or more of the text fragments generated by the text frame identifier 212. The context identifier 214 can obtain one or more extended text objects distinct from the legislative text. The extended text objects can be associated with, related to, share common text with, or share references to, for example, with the legislative text or any source text obtained by the text segmenter 210 as a primary text. A primary text can include a text including one or more identifiers based on which the extended text objects are obtained. As one example, a primary text can include a title of "House Resolution 1965" or "H.R. 1965" from with additional external text objects referencing that title can be obtained from, for example, one or more of the text storage systems 130. As one example, the extended text objects distinct from the legislative text can include conference notes or transcripts, committee or subcommittee notes or transcripts, third party research, third party legislative analysis on the legislative text, first party research, and first party legislative analysis on the legislative text. The context identifier 214 can identify text associated with the text fragments from within the extended text objects distinct from the legislative text. As one example, the context identifier 214 can identify all portions of text associated with a particular group of phrases in a legislative text. Here, the additional text can provide definitions, examples, and narrowing information associated with the text fragment. The context identifier 214 can also include instructions to segment at least a portion of one or more of the extended text objects distinct from the legislative text, to at least extract the definitions, examples and narrowing information from the source text as structured text fragments.

The text condenser 220 can generate one or more condensed text objects based on one or more of the segmented text, its associated text identifiers, and its additional text extracted by the context identifier 214. The text condenser 220 can generate a condensed text object including a particular structure, and including one or more positions associated with a portion of segmented text or any block or fragment associated therewith. The text condenser 220 can generate the condensed text object in accordance with a machine learning model, or deep learning model, for example. The machine learning or deep learning model can receive as input any portion of the legislative text and any text object, object, or the like, derived therefrom or associated therewith. As one example, the text condenser 220 can generate a block of text having a predetermined length in the form of a question or a multiple choice prompt, for example. The block of text can be based on a predetermined template into which one or more text fragments or portion of text can be embedded. The predetermined template can include one or more embeddable regions respectively compatible with text fragments, context, or metadata, for example, associated with a particular text fragment. Thus, for example, the text condenser 220 can generate a prompt asking a constituent whether they support a particular tax credit for children, or tax increase for paid leave, based on the text fragments and associated information. The text condenser 220 can thus achieve the practical application of generating a corresponding condensed text object including a summary of text within a received text of arbitrary length, including thousands of pages in length or more, that would otherwise be impossible to complete manually in a sufficient time period to allow user feedback before the close of the legislative process relating to that received text.

The feedback text generator 230 can generate, one or more prompts, choices, or selections, for example, associated with the condensed text object or embedded therewith, and a feedback text block. The feedback test generator can generate the condensed text object in accordance with a machine learning model, or deep learning model, for example. The machine learning or deep learning model can receive as input any portion of the legislative text and any text object, object, or the like, derived therefrom or associated therewith. As one example, the feedback text generator 230 can generate a plurality of choices for level of support by a constituent. The feedback text generator 230 can thus achieve the practical application of generating a corresponding feedback text object including structured and quantifiable classification metrics for a received text of arbitrary length, including thousands of pages in length or more, that would otherwise be impossible to complete manually in a sufficient time period to allow user feedback before the close of the legislative process relating to that received text.

The feedback interface generator 232 can generate a presentation object associated with a feedback text object. The presentation object can include instruction to present a user interface presentation at a particular application device 140 associated with one or more particular members of a population reference. Thus, the feedback interface generator 232 can generate a presentation object transmissible to a plurality of constituents at their respective remote devices for immediate feedback. The feedback interface generator 232 can thus achieve the practical application of generating a corresponding presentation object operable to obtain quantifiable classification metrics from thousands or millions of members of a population reference and based on a received text of arbitrary length, including thousands of pages in length or more, that would otherwise be impossible to complete manually in a sufficient time period to allow user feedback before the close of the legislative process relating to that received text.

The population filter 240 can create a modified population reference based on one or more predetermined population classification metrics. The population reference can also include at least a portion of the people or constituents as members of the population reference. As one example, a population reference can be associated with the geography of a particular Congressional district, and members of the population reference can include all voters, constituents, party voters, primary voters, or eligible voters, for example.

The population comparator 242 can generate one or more comparative metrics based on one or more individuals associated with a population reference or the population reference in aggregate. The population comparator 242 can generate an aggregate, composite, or like metric indicating a correspondence level between any two groups of population reference entities. As one example, the population comparator 242 can generate a metric comparing an individual representative or candidate to an individual constituent in the population reference, or the population reference as a whole. Thus, the metric can indicate a level of "agreement" between a representative or candidate and the population reference as a whole, in substantially real-time and substantially across the entire population reference. In addition, an individual constituent can be associated with a metric indicating agreement with a particular representative or candidate in the population reference. The population comparator 242 can thus achieve the practical application of generating numerous quantifiable metrics individualized to thousands or millions of members of a population reference and for particular portions of received text of arbitrary length, including thousands of pages in length or more, that would otherwise be impossible to complete manually in a sufficient time period to allow user feedback before the close of the legislative process relating to that received text.

The database interfaces 250 can operatively couple one or more of the components of the system memory 200 to one or more of the text storage systems 130. The database interfaces 250 can include at least one API corresponding to one or more of the text storage systems 130, can translate, transmit, compress, or package, for example, one or more instructions generated by the system memory 200 for the text storage systems 130, and can perform corresponding operations to obtain at least instructions and text objects, for example, from the text storage systems 130. The database interfaces 250 can be compatible with one or more individual APIs of the text storage systems 130 to obtain one or more extended text objects from one or more of the text storage systems 130. The individual APIs or the like of the text storage systems 130 can vary based on type of database structure, authentication protocol, or authorization protocol, for example, and the database interfaces 250 can be configured to be compatible with heterogeneous interfaces thereof.

The presentation interfaces 252 can operatively couple one or more of the components of the system memory 200 to one or more of the application devices 140. The presentation interfaces 252 can include at least one API corresponding to one or more of the application devices 140, can translate, transmit, compress, or package, for example, one or more instructions generated by the system memory 200 for the application devices 140, and can perform corresponding operations to obtain at least instructions and feedback objects, for example, from the application devices 140. The presentation interfaces 252 can be compatible with one or more individual APIs of the application devices 140 to generate one or more user interfaces and user interface control affordances at the application devices 140. The individual APIs or the like of the application devices 140 can vary based on type of mobile device or network, for example, and the presentation interfaces 252 can be configured to be compatible with heterogeneous interfaces thereof.

The operating system 260 can include hardware control instructions and program execution instructions. The operating system 260 can include a high level operating system, a server operating system, an embedded operating system, or a boot loader. The operating system 260 can include one or more instructions operable specifically with or only with the system processor 110.

Figure 3:
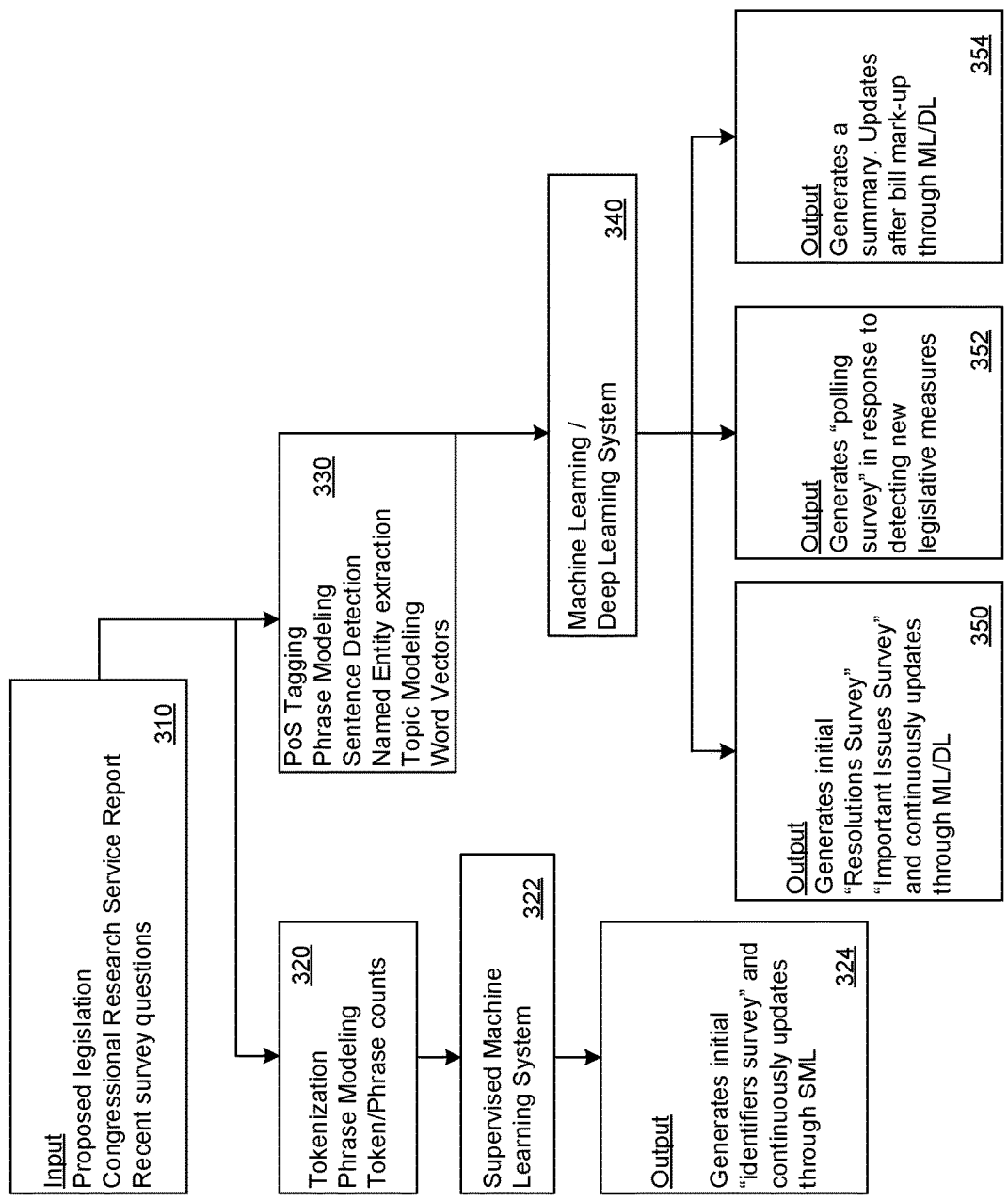
FIG. 3 illustrates an example machine learning system architecture, in accordance with present implementations.

FIG. 3 illustrates an example machine learning system architecture, in accordance with present implementations. As illustrated by way of example in FIG. 3, an example machine learning system architecture 300 includes an input interface 310, an identifier segmenter 320, a supervised machine learning system 322, an identifier output interface 324, a content segmenter 330, an unsupervised machine learning system 340, a continuous output interface 350, an event creation output interface 352, and an event modification output interface 354.

The input interface 310 can obtain text objects from external sources. In some implementations, the input interface 310 corresponds to the database interfaces 250. The input interface 310 can obtain proposed legislation text objects, and supplemental text objects associated with the proposed legislation text objects. Legislation text objects can include Senate bills, House bills, for Federal and state legislatures. Supplemental text objects can include first party reports such as the Congressional Research Service Report, and third party reports such as third party surveys related to the legislation.

The identifier segmenter 320 can generate text fragments from any text object obtained from the input interface 310. In some implementations, the identifier segmenter 320 corresponds to the text segmenter 210. The identifier segmenter 320 can fragment text by tokenization, phrase modeling, token counts, or phrase counts, for example. Tokenization can include part of speech tagging, position tagging, or definition tagging, for example. Phrase modeling can include extracting phrases related to particular predetermined text strings.

The supervised machine learning system 322 can generate an output text object based on input obtained from the identifier segmenter 320. In some implementations, the supervised machine learning system 322 corresponds to the text segmenter 210 or can be a component thereof. The supervised machine learning system 322 can include one or more inputs based on the tokenized text objects, phrase models, token counts, phrase counts, and any other portion of the text fragments, any text associated with the text fragments, and the like. The tokenized text objection, phrase models, token counts, phrase counts, and any other portion of the text fragments, any text associated with the text fragments can also be provided as input to the supervised machine learning model 322 as various runtime metrics for executing the machine learning model against corresponding runtime input. The supervised machine learning model 322 can be trained based on one or more training metrics corresponding to the runtime metrics. The supervised machine learning model 322 can generate identifier feedback objects for various text fragments appearing a predetermined number of times in a text object according to a threshold.

The identifier output interface 324 can provide an output generated by the supervised machine learning system 322. In some implementations, the identifier output interface 324 corresponds to at least one of the text condenser 220, the feedback text generator 230, and the feedback interface generator 232, or can be a component thereof. The identifier output interface 324 can provide an identifiers survey feedback object including one or more identifier feedback objects. The supervised machine learning model 322 can generate the identifier feedback objects based on a determination of one or more text objects describing a member of a population reference, or associated with a member of a population reference. As one example, an identifier feedback object can include a prompt, selection or the like, for a demographic trait of a member of the population reference that also appears in the legislative text, or can be inferred from the legislative text based on one or more of the inputs to the supervised machine learning system 322 by the supervised machine learning system 322.

The content segmenter 330 can generate text fragments from any text object obtained from the input interface 310. In some implementations, the content segmenter 330 corresponds to the text segmenter 210. The content segmenter 330 can fragment text by part of speech, phrase modeling, sentence detection, named entity extraction, topic modeling, and word vectors, for example. Sentence detection can include identifying a complete sentence containing a particular target character or string, for example, and can include identifying structure of a sentence including the subject or predicate, for example. As one example, the content segmenter 330 can generate one or more text fragments relevant to or associated with, for example, a particular text fragment extracted or identified, for example, by the identifier segmenter 320. Topic models can include clusters of words having proximity or syntactic proximity to particular text fragments generated by the identifier segmenter 320. The topic models can correlate particular text fragments to particular words, phrases, and the like, based on a clustering association. The clustering association can be N-dimensional, and can be based at least on one or more inputs to, or outputs from, one or more of the identifier segmenter 320 and the content segmenter 330.

The unsupervised machine learning system 340 can generate an output text object based on input obtained from the content segmenter 330. In some implementations, the unsupervised machine learning system 340 corresponds to the text condenser 220 or can be a component thereof. The unsupervised machine learning system 340 can include one or more inputs based on the tokenized text objects, phrase models, token counts, phrase counts, detected sentences, part of speech context, topic models, and word vectors, and any other portion of the text fragments, any text associated with the text fragments, and the like. The tokenized text objects, phrase models, token counts, phrase counts, and any other portion of the text fragments, any text associated with the text fragments can also be provided as input to the unsupervised machine learning system 340 as various runtime metrics for executing the machine learning model against corresponding runtime input. The supervised machine learning model 322 can be trained based on one or more training metrics corresponding to the runtime metrics. The unsupervised machine learning system 340 can generate condensed text objects for any text fragments appearing in a text object.

The continuous output interface 350 can provide an output generated by the unsupervised machine learning system 340. In some implementations, the continuous output interface 350 corresponds to at least one of the text condenser 220, the feedback text generator 230, and the feedback interface generator 232, or can be a component thereof. The continuous output interface 350 can provide a resolutions survey feedback object associated with one or more text fragments. The unsupervised machine learning system 340 can generate the resolutions survey feedback object based on a correlation between one or more identifier feedback objects received from an individual user and one or more text fragments associated with an extended text object. As one example, the continuous output interface 350 can generate one or more feedback objects, each including a query including a prompt and a response affordance or input, for example. The prompt can request whether an individual user finds a particular issue associated with a text fragment in the extended text object, legislation, or the like, important, relevant, or interesting for example, to that individual user. Thus, the continuous output interface 350 can generate a quantitative correlation between identifiers of an individual user and particular portions of content of an extended text object.

The event creation output interface 352 can provide an output generated by the unsupervised machine learning system 340. In some implementations, the event creation output interface 352 corresponds to at least one of the text condenser 220, the feedback text generator 230, and the feedback interface generator 232, or can be a component thereof. The event creation output interface 352 can provide a polling survey feedback object associated with one or more text fragments. The unsupervised machine learning system 340 can generate the polling survey feedback object based on one or more condensed text objects generated from a corresponding extended text object, and can also be based on a correlation between one or more identifier feedback objects received from an individual user and one or more text fragments associated with an extended text object. As one example, the event creation output interface 352 can generate one or more feedback objects, each including a query including a prompt and a response affordance or input, for example. The prompt can request whether an individual supports or agrees with a particular issue associated with a text fragment in the extended text object, legislation, or the like. Thus, the continuous output interface 350 can generate a quantitative correlation between opinions of an individual user and particular portions of content of an extended text object.

The event modification output interface 354 can provide an output generated by the unsupervised machine learning system 340. In some implementations, the event modification output interface 354 corresponds to at least one of the text condenser 220, the feedback text generator 230, and the feedback interface generator 232, or can be a component thereof. The event modification output interface 354 can provide a condensed text object associated with one or more text fragments. The unsupervised machine learning system 340 can generate the condensed text object generated from a corresponding extended text object, and can also be based on a correlation between one or more identifier feedback objects received from an individual user and one or more text fragments associated with an extended text object. As one example, the event modification output interface 354 can generate one or more condensed objects, each including at least one text fragment, and contextualizing text generated based on at least one of the extended text object and a separate text distinct from the extended text object. Thus, the condensed text object, can include the text fragment, a portion of the extended text object to define the text fragment, and at least a portion of the separate text distinct from the extended text object to define the text object or one or more portions of the extended text object, for example.

Figure 4:
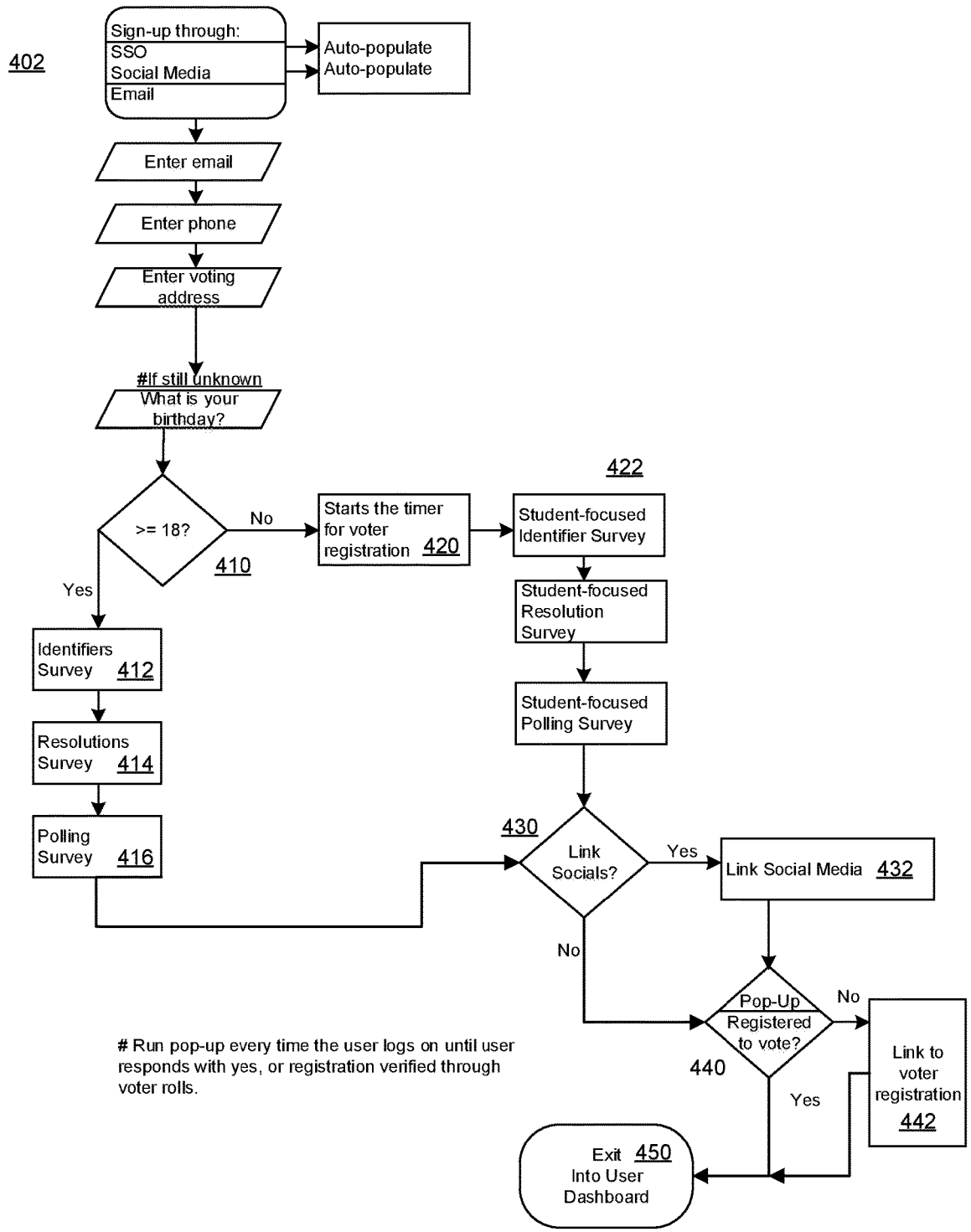
FIG. 4 illustrates an example distributed constituent communication method, in accordance with present implementations.

FIG. 4 illustrates an example distributed constituent communication method, in accordance with present implementations. In some implementations, the example system 100 performs method 400 according to present implementations. In some implementations, the method 400 begins at step 402.

At step 402, the example system obtains one or more authentication credentials and identification objects. The authentication credentials can include a login attempt by one or more of a single sign on (SSO), a social media account, and an email address, for example. The authentication credentials can be autopopulated based on a previous login attempt or successful login, for example. Identification objects can include a contact email address, a contact phone, a voting address, and a birthday. The example system can send a validation email, and save the validation email to a user profile associated with the individual user. The example system can send a validation text. In response to receiving the voting address, the example system can perform a ZIP code search to generate a five digit or nine digit ZIP code or postal code, for example. The individual user can, by the ZIP code or postal code, be associated with particular elected officials and candidates associated with those particular ZIP codes or postal codes. All of the responses obtained above can be stored at the system. The method 400 then continues to step 410.

At step 410, the example system determines whether the user is at least 18 years of age. In accordance with a determination that the user is at least 18 years of age, the method 400 continues to step 412. In accordance with a determination that the user is not at least 18 years of age, the method 400 continues to step 420.

At step 412, the example system generates an identifiers survey. The example system can generate an identifiers survey in accordance with the output of the identifier output interface 324. The method 400 then continues to step 414. At step 414, the example system generates a resolutions survey. The example system can generate an identifiers survey in accordance with the output of the continuous output interface 350. The method 400 then continues to step 416. At step 416, the example system generates a polling survey. The example system can generate a polling survey in accordance with the output of the event creation output interface 352. The method 400 then continues to step 430. The example system can store the inputs obtained at steps 412, 414 and 416, and generate one or more coded annotations to one or more of the text fragments, and the extended test objects, for example, based thereon.

At step 420, the example system initiates a times for voter registration. The timer can include a countdown representing the number of days, for example, until the individual user is 18, and hence, eligible to vote in a particular election. The method 400 then continues to step 422.

At step 422, the example system can generate one of more of a student-focused identifier survey, a student-focused resolutions survey, and a student-focused polling survey. Each of the student-focused identifier survey, the student-focused resolutions survey, and the student-focused polling survey can at least partially correspond respectively to the identifier survey, the resolutions survey, and the polling survey of steps 412, 414 and 416. The student-focused surveys can differ in one or more of content, delivery, and prioritization, for example from the surveys of steps 412, 414 and 416. The method 400 then continues to step 430. The example system can store the inputs obtained at step 422, and generate one or more coded annotations to one or more of the text fragments, and the extended test objects, for example, based thereon and based on identifying the survey responses as student-focused.

At step 430, the example system determines whether to link the individual user account with one or more social media accounts. The determination to link the individual user account with one or more social media accounts can include obtaining a response from the user's remote device indicating an approval or authorization, for example, to link the use's account to the social media account. The example system can accomplish the linking by SSO, for example. In accordance with a determination to link the individual user account with one or more social media accounts, the method 400 continues to step 432. In accordance with a determination not to link the individual user account with one or more social media accounts, the method 400 continues to step 440. At step 432, the example system links a social media account and optionally posts content to the social media account. The content can include a text or multimedia message indicating one or more responses to one or more portions of one or more of the identifiers surveys, the resolutions survey, and the polling survey, and the student-focused surveys corresponding thereto. The method 400 then continues to step 440.

At step 440, the example system determines whether an individual user is registered to vote. The determination can include providing at least one instruction to an individual user's remote device to generate a pop-up message at the remote device. The example system can, for example, execute generation of the pop-up every time the user logs on, until the user responds with a yes, or the user's registration is verified through voter rolls. In accordance with a determination that the individual user is registered to vote, the method 400 continues to step 450. In accordance with a determination that the individual user is not registered to vote, the method 400 continues to step 442. At step 442, the example system links to an external voter registration website or portal, for example. The external website or portal can include a government website including online voter registration, voter registration verification, and the like. In some implementations, the method 400 ends at step 442.

At step 450, the example system exits into a user dashboard. The user dashboard can be individualized for a particular individual user in accordance with one or more of the user interfaces 600 and 800. In some implementations, the method 400 ends at step 450.

Figure 5:
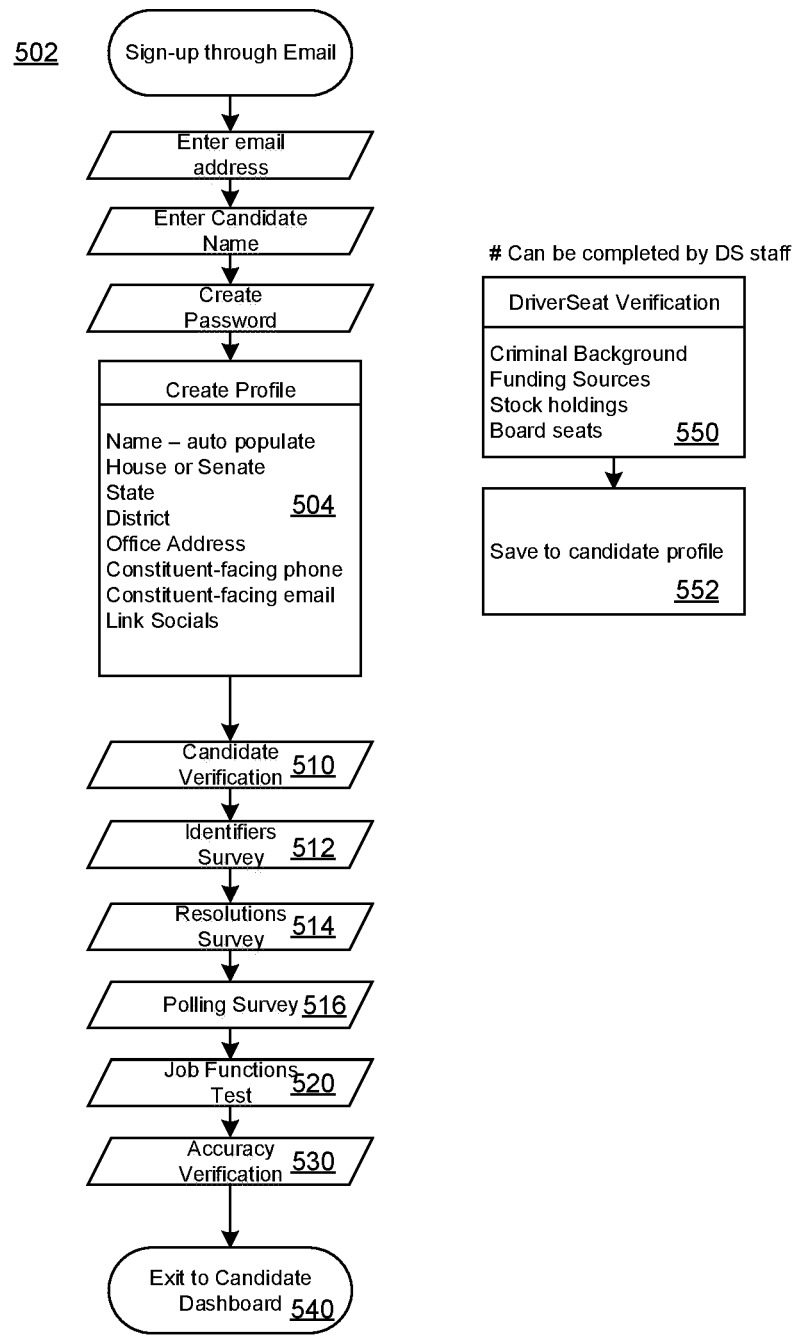
FIG. 5 illustrates an example distributed candidate communication method, in accordance with present implementations.

FIG. 5 illustrates an example distributed candidate communication method, in accordance with present implementations. In some implementations, at the example system 100 performs method 500 according to present implementations. In some implementations, the method 500 begins at step 502.

At step 502, the example system obtains one or more authentication credentials and identification objects. The authentication credentials can include the candidate's email address, a new password. The identification objects can include the candidate's name and the candidate's profile. The email address can be used for logging into the example system and as a contact email by the example system or any agents, bots, or chatbots, for example. The system can search for duplicate email addresses and send a verification message to the candidate's remote device. Once verified, the system can save the email address in the candidate's profile corresponding to the candidate's login identifier. The candidate profile can include at least one of a candidate name, a legislative body identifier, a legislative district identifier, a state, an office address, a constituent-facing phone number, a constituent-facing email address, and links to one or more social media accounts associated with the candidate. The system can search for duplicate candidate names, or any other field in the candidate's profile, and save the candidate's name, or any other field in the candidate's profile, in the candidate's profile. The system can generate a warning message and provide a notification to the candidate's remote device for close matches satisfying a match threshold. As one example, a match threshold can correspond to a 98% character match between an entered candidate name and a potentially duplicate character name. The method then continues to step 504. At step 504, the example system creates a profile. The profile can include one or more indications of name, house or senate, state, district, office address, constituent-facing phone, constituent-facing email, and link socials. The method 500 then continues to step 510.

At step 510, the example system verifies a candidate. The candidate verification can include one or more questions or affirmation transmitted to the candidate's remote device to link or register the candidate's remote device with the system. The verification can include at least one of a warning message and a checkbox. The method 500 then continues to step 512.

At step 512, the example system generates an identifiers survey. Step 512 with respect to a candidate user can correspond to step 412 with respect to an individual constituent user in one or more of the structure and operation of the generated identifier survey. The method 500 then continues to step 514. At step 514, the example system generates a resolutions survey. Step 514 with respect to a candidate user can correspond to step 414 with respect to an individual constituent user in one or more of the structure and operation of the generated resolutions survey. The method 500 then continues to step 516.

At step 516, the example system generates a polling survey. Step 516 with respect to a candidate user can correspond to step 416 with respect to an individual constituent user in one or more of the structure and operation of the generated polling survey. The method 500 then continues to step 520. The example system can store the inputs obtained at steps 512, 514 and 516, and generate one or more coded annotations to one or more of the text fragments, and the extended test objects, for example, based thereon.

At step 520, the example system generates a job functions test. The job functions test can include one or more feedback objects including one or more prompts regarding the candidate's district or legislative body, for example. The test can include a timed, unrepeatable, uneditable civics test, for example. The method 500 then continues to step 530. At step 530, the example system verifies the accuracy of the obtained responses associated with the candidate. The candidate verification can include one or more questions or affirmation transmitted to the candidate's remote device to link or register the candidate's remote device with the system. The verification can include an electronic signature capture obtained from an electronic signature captured at the candidate's remote device, for example. The method 500 then continues to step 540. At step 540, the example system exits into a candidate dashboard. The candidate dashboard can be individualized for a particular individual candidate user in accordance with one or more of the user interfaces 700, 1200 and 1300. The candidate can grant access to the candidate's staff as additional users. The candidate user or the additional staff can add a photo or other supplemental profile information, event information, location, times, coordinates, and summaries, for example, and can respond to surveys. In some implementations, the method 500 ends at step 540.

At step 550, the example system verifies identity of a candidate. The system can interface with external private, government, or public data centers or databases, for example to obtain identity verification information from a candidate. Identity verification can include identifying a criminal background, funding sources, financial interests, and associations, for example. The identity information can include stock holdings and board seats. The method 500 then continues to step 552. At step 552, the example system saves the identity verification information to the candidate's profile. The system can use the candidate verification information by at least presenting at least a portion thereof to a constituent user interface, and providing at least a portion thereof as input to one or more of the supervised machine learning system and the unsupervised machine learning system. In some implementations, the method 500 ends at step 552. It is to be understood that the system can convert the candidate profile to a representative profile in response to obtaining an input of successful election of the candidate by the candidate dashboard user interface, or by independent conversion of the profile by the example system.

Figure 6:
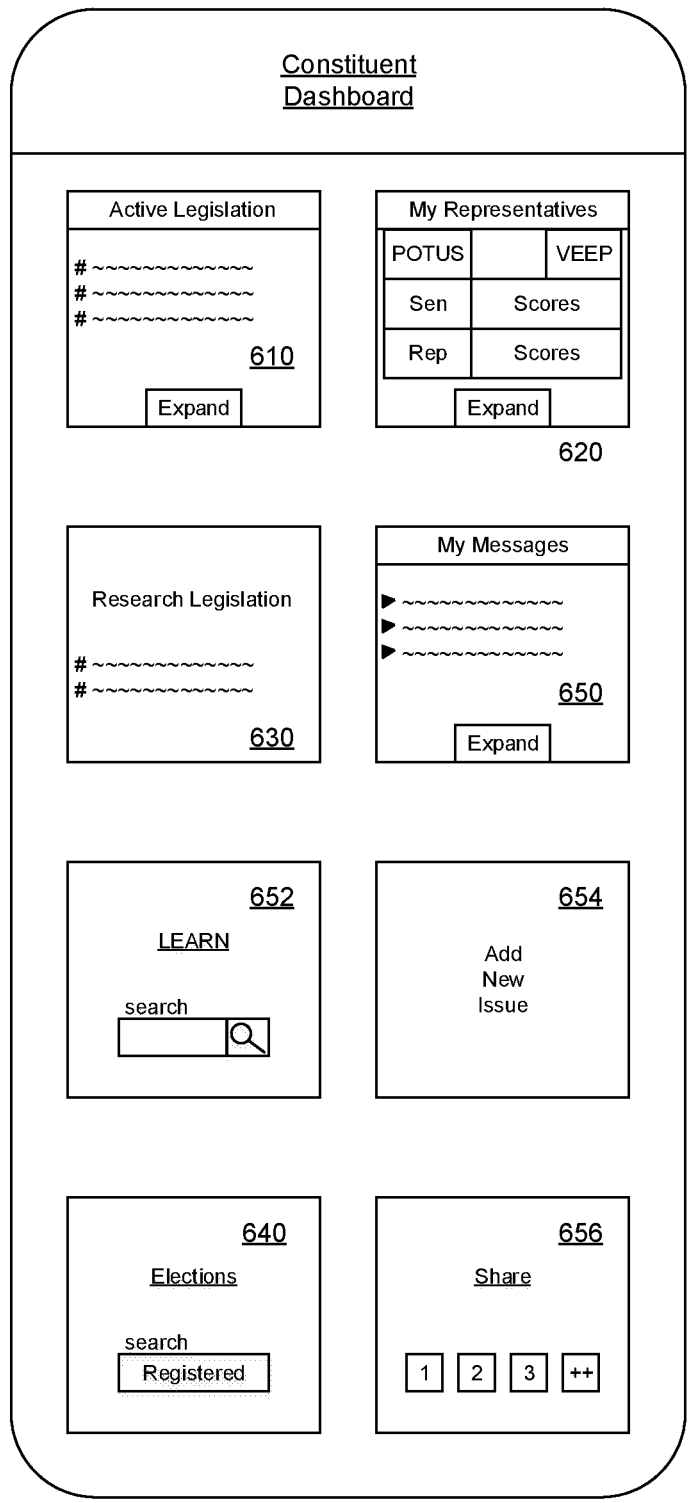
FIG. 6 illustrates an example constituent dashboard user interface executable on a remote device, in accordance with present implementations.

FIG. 6 illustrates an example constituent dashboard user interface executable on a remote device, in accordance with present implementations. As illustrated by way of example in FIG. 6, an example user interface 600 includes an active legislation presentation portion 610, a representative presentation portion 620, a research presentation portion 630, an election search portion 640, a messages presentation portion 650, a search portion 652, an expansion portion 654, and a social sharing portion 656.

The active legislation presentation portion 610 includes a user interface portion presenting one or more pieces of legislation under consideration or otherwise active in the constituent's jurisdiction. The representative presentation portion 620 includes a user interface portion presenting one or more elected officials in one or more jurisdictions associated with the constituent. The research presentation portion 630 includes a user interface portion presenting one or more text objects associated with pieces of legislation under consideration or otherwise active in the constituent's jurisdiction. The text objects can include first part or third party research documents, analyses, or summaries, for example. The election search portion 640 includes a user interface portion presenting one or more election objects in the constituent's jurisdiction. The election objects can include a voter registration status and a listing of upcoming or recently held elections, for example. The messages presentation portion 650 includes a user interface portion presenting one or more messages relevant to the constituent or the constituent's jurisdiction. The messages can include requests to participate in a survey, and communications with candidates and elected officials, for example. The search portion 652 includes a user interface portion presenting one or more search interfaces.

The expansion portion 654 includes a user interface portion available to present any user interface. As one example, the constituent can select the expansion portion 654 to generate a further active legislation presentation portion directed to a jurisdiction, issue or group of issues, demographic or group of demographics, or interest or group of interests different from that or those presented at the active legislation presentation portion 610. The social sharing portion 656 includes a user interface portion presenting one or more social media sharing options. The options can include control affordances to initiate a communication with one or more external social media platforms.

Figure 7:
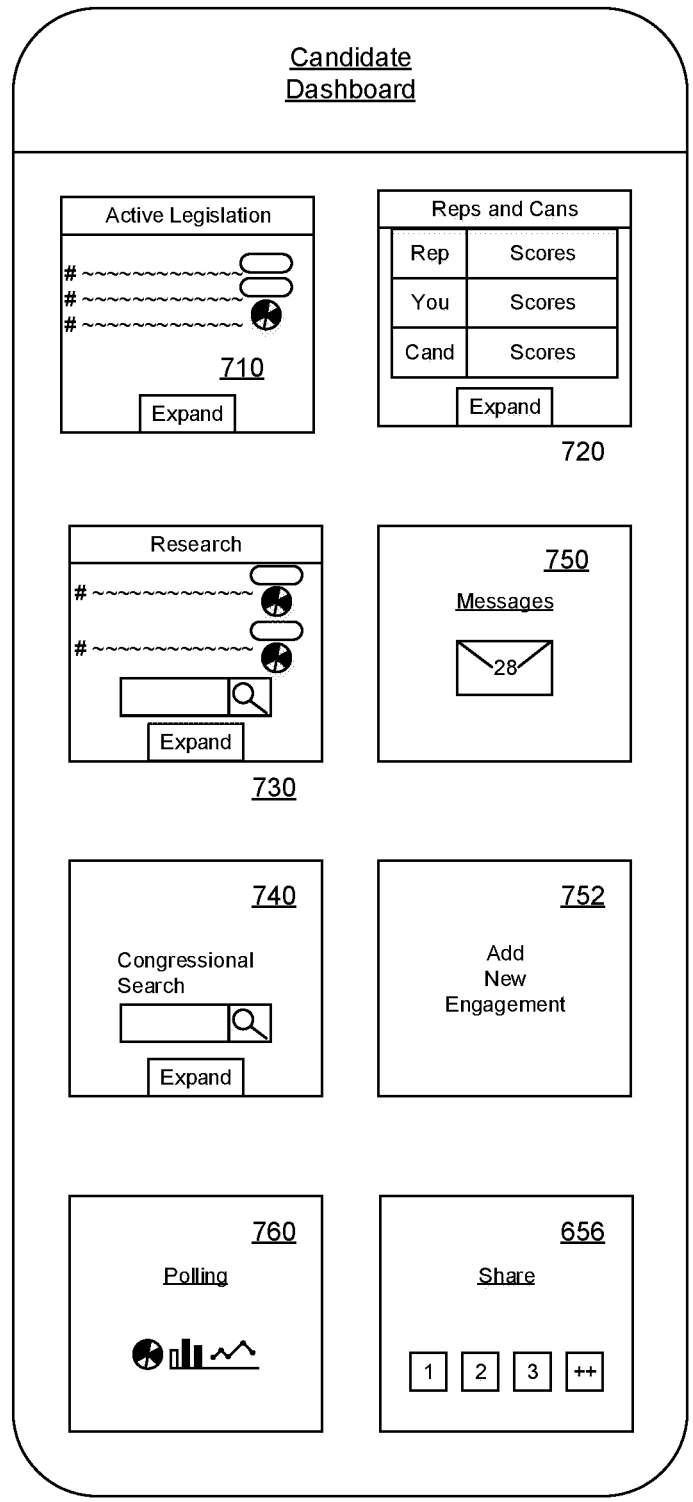
FIG. 7 illustrates an example candidate dashboard user interface executable on a remote device, in accordance with present implementations.

FIG. 7 illustrates an example candidate dashboard user interface executable on a remote device, in accordance with present implementations. As illustrated by way of example in FIG. 7, an example user interface 700 includes the social sharing portion 656, an active legislation presentation portion 710, a representative presentation portion 720, a research presentation portion 730, a congressional search portion 740, a messages presentation portion 750, an expansion portion 752, and a polling portion 760.

The active legislation presentation portion 710 includes a user interface portion presenting one or more pieces of legislation under consideration or otherwise active in the candidate's jurisdiction. The active legislation presentation portion 710 can include one or more badges indicating agreement with the candidate's potential constituents satisfying a particular agreement threshold. The active legislation presentation portion 710 can also include one or more pie chart presentations indicating particular aggregate feedback from the candidate's potential constituents according to one or more metrics. The representative presentation portion 720 includes a user interface portion presenting one or more comparative metrics associated with one or more elected officials and candidates in the jurisdiction associated with the candidate.

The research presentation portion 730 includes a user interface portion presenting one or more text objects associated with pieces of legislation under consideration or otherwise active in the constituent's jurisdiction. The text objects can include first part or third party research documents, analyses, or summaries, for example. The research presentation portion 730 can also include one or more badges or pie chart presentations corresponding in at least one of structure and operation to the corresponding badges and pie chart presentations of the active legislation presentation portion 710.

The congressional search portion 740 includes a user interface portion presenting one or more search interfaces associated with a particular jurisdiction or legislative body. The messages presentation portion 750 includes a user interface portion presenting one or more messages relevant to the candidate or the candidate's jurisdiction. The messages can include requests to participate in a survey, and communications with constituents, for example. The expansion portion 752 includes a user interface portion available to present any user interface. As one example, the constituent can select the expansion portion 752 to generate a further active legislation presentation portion directed to a jurisdiction, issue or group of issues, demographic or group of demographics, or interest or group of interests different from that or those presented at the active legislation presentation portion 710. As one example, the further active legislation portion can show legislation, and corresponding badges and pie chart presentations for a different precinct within a representative's district, or a different congressional district in a senator's state.

The polling portion 760 includes a user interface portion presenting one or more polling presentations. The polling portion 760 can include one or more badges and pie chart presentations, and can include aggregated versions thereof. The aggregate portions can present global support or importance feedback for an entire jurisdiction, or particular portions thereof for predetermined subsets of constituents or demographics, for example. The polling portion 760 can include or be associated with a user interface control affordance to present a polling dashboard in accordance with user interface 1300, for example.

Figure 8:
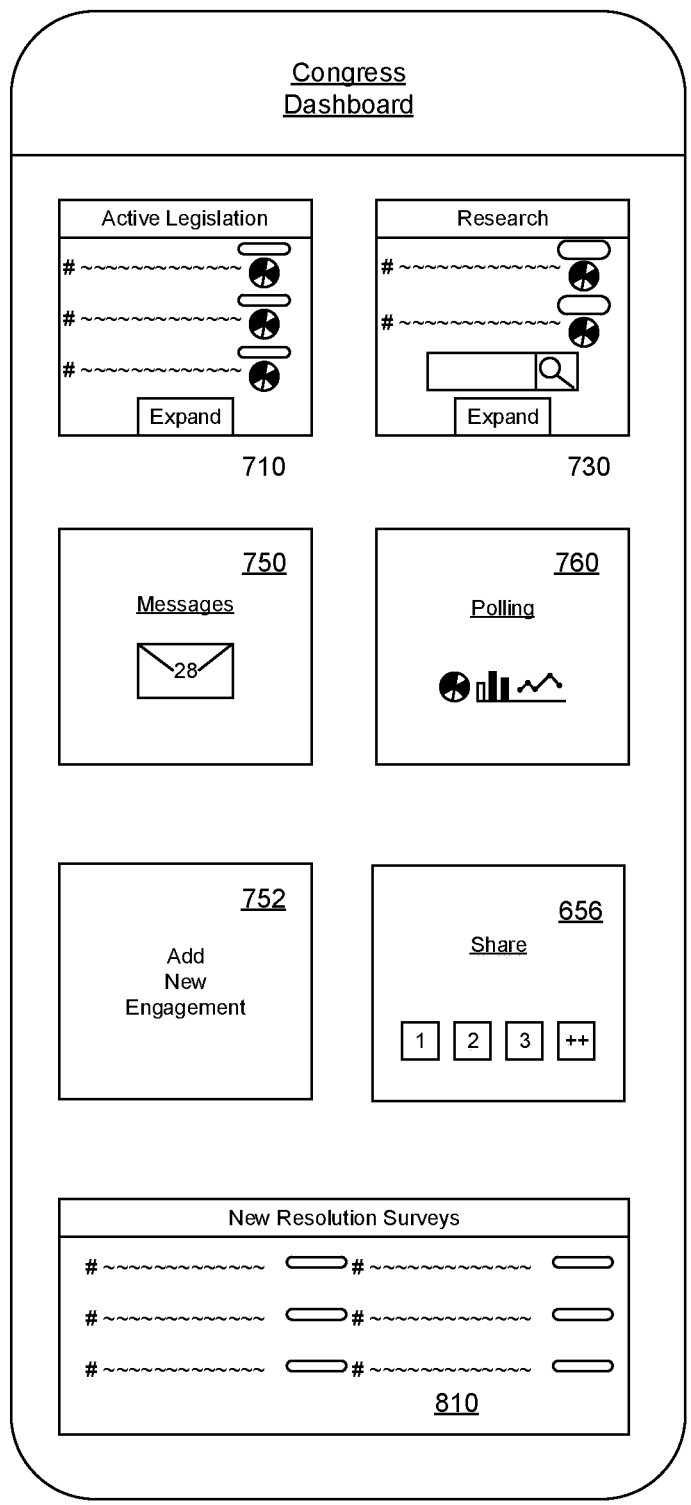
FIG. 8 illustrates an example congressional dashboard user interface executable on a remote device, in accordance with present implementations.

FIG. 8 illustrates an example congressional dashboard user interface executable on a remote device, in accordance with present implementations. As illustrated by way of example in FIG. 8, an example user interface 800 includes the social sharing portion 656, the active legislation presentation portion 710, the research presentation portion 730, the messages presentation portion 750, the expansion portion 752, and a survey presentation portion 810.

The survey presentation portion 810 includes a user interface portion presenting one or more surveys relevant to the candidate's jurisdiction. The survey presentation portion 810 can include one or more badges indicating agreement with the candidate's potential constituents satisfying a particular agreement threshold, with respect to a particular piece of legislation corresponding to a particular survey of the survey presentation portion 810. The survey presentation portion 810 can also include one or more pie chart presentations indicating particular aggregate feedback from the candidate's potential constituents according to one or more metrics.

FIG. 9 illustrates an example constituent identifier user interface executable on a remote device, in accordance with present implementations. As illustrated by way of example in FIG. 9, an example user interface 900 includes an identifier selection portion 910.

The identifier selection portion 910 includes a user interface portion presenting one or more identifier text objects and one or more corresponding control affordances. The identifier text objects can correspond to text fragments output by the supervised machine learning system. The control affordances can include a "checkbox" user interface element to indicate that the individual user is associated with a particular characteristic, demographic, interest, or issue, for example.

Figure 10:
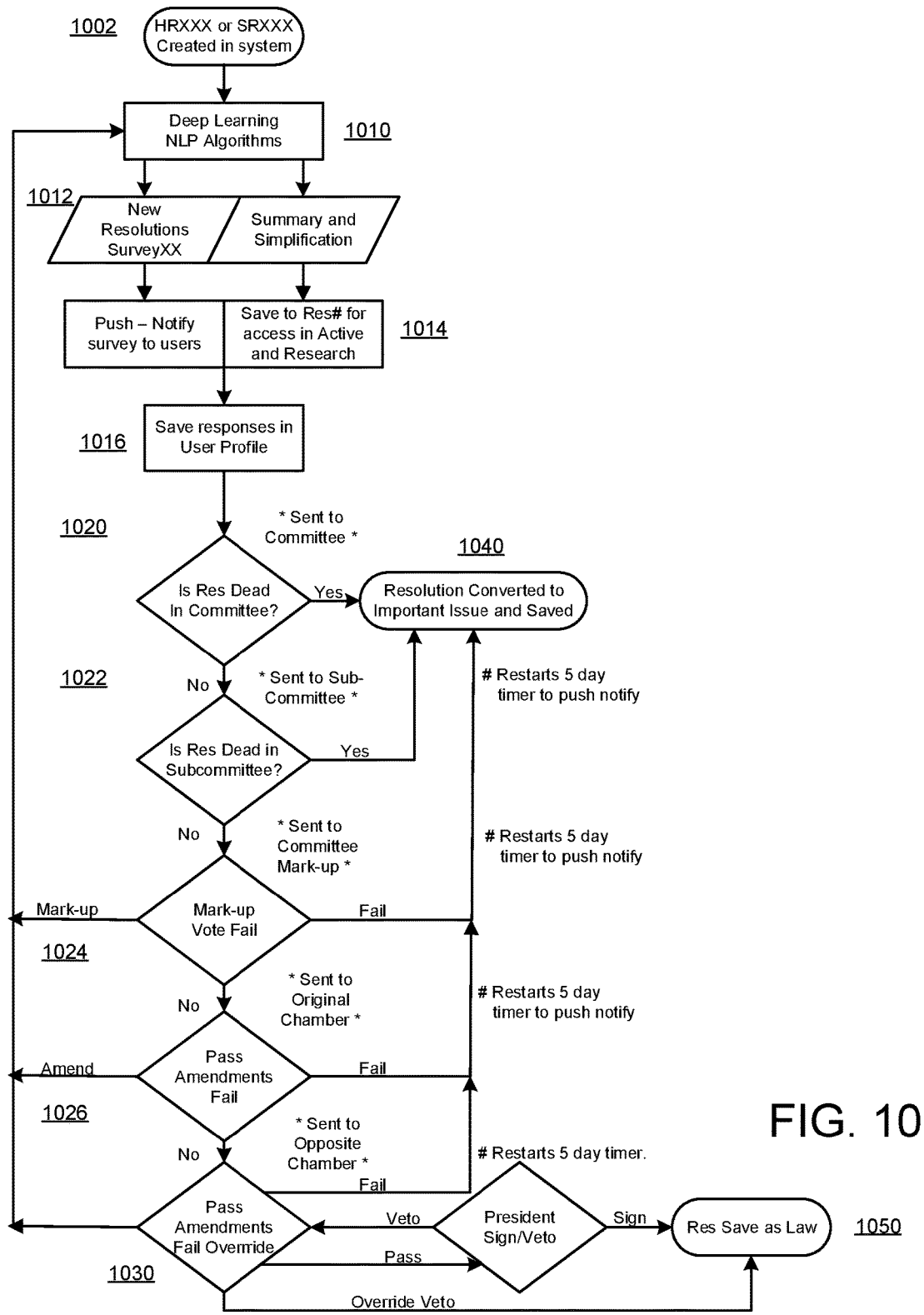
FIG. 10 illustrates an example distributed legislation communication method, in accordance with present implementations.

FIG. 10 illustrates an example distributed legislation communication method, in accordance with present implementations. In some implementations, the system 100 performs method 1000 according to present implementations. The method 1000 can correspond to a process for generating one or more distributed metrics corresponding to a new legislative resolution, through the resolution's lifecycle as a legislative bill. In some implementations, the method 1000 begins at step 1002.

At step 1002, the example system creates a resolution. The system can create the resolution in response to an indication that a bill or resolution, for example, is introduced in a legislative body. The legislative body can be but is not limited to a Federal or state House, Senate, or the like. Resolutions can be introduced with limited/incomplete text. The system can supplement the incomplete legislative with, for example, text obtained from an external source to the legislative text. The external text can include a Congressional Research Service (CRS) summary available at a public digital resource. As one example, the system can scrape a web site, including but not limited to CRS, to search and update summary text corresponding to the resolution. The method 1000 then continues to step 1010.

At step 1010, the example system generates one or more outputs in response to one or more supervised or unsupervised machine learning systems. The system can generate according to step 1010 in accordance with the structure and operation of at least a portion of the architecture 200. The method 1000 then continues to step 1020.

At step 1012, the example system generates at least one new resolutions survey for the created resolution, and corresponding summary and simplification of the resolution. While, the resolution is active, the system can present results of interactive constituents and representatives from the new resolution survey, as obtained from feedback objects. The popularity of removed line items can be reported on to representatives. The summary and simplification can include generating one or more condensed text objects as discussed above. The method 1000 then continues to step 1014. At step 1014, the example system generates and transmits a push notification of the survey to one or more users. The system can also save responses with an association to the new resolution. The method 1000 then continues to step 1016.

At step 1016, the example system saves response from the user in a corresponding individual user's profile. The profile can include a constituent profile, a candidate profile and a representative profile, depending on the identity of the responding user. The system can start a timer corresponding to a predetermined period of time, to transmit push notifications or alerts, for example, to user's remote devices to encourage responses by those users. A predetermined period of time can, for example, be five days. The system can also provide push notifications, alerts, or the like to indicate availability of survey results, to representatives and candidates, in substantially real time. Substantially real time can include a delay time of one minute or less. For resolutions that are updated, removed line items can be saved to be polled later, and new survey results can overwrite previously obtained results. The method 1000 then continues to step 1020.

At step 1020, the example system determines whether the resolution survives a committee vote. The resolution can be brought to a vote in a legislative committee, and the system can obtain an indication of the result of the vote, and any additional parameters associated therewith. In accordance with a determination that the resolution survives a committee vote, the method 1000 continues to step 1022. In accordance with a determination that the resolution does not survive a committee vote, the method 1000 continues to step 1040.

At step 1022, the example system determines whether the resolution survives a subcommittee vote. The resolution can be brought to a vote in a legislative subcommittee, and the system can obtain an indication of the result of the vote, and any additional parameters associated therewith. In accordance with a determination that the resolution survives a subcommittee vote, the method 1000 continues to step 1024. In accordance with a determination that the resolution does not survive a subcommittee vote, the method 1000 continues to step 1040.

At step 1024, the example system determines whether the resolution survives a committee markup vote. The resolution can be brought to a vote in legislative markup, and the system can obtain an indication of the result of the vote, and any additional parameters associated therewith. In accordance with a determination that the resolution survives a committee markup vote, the method 1000 continues to step 1026. In accordance with a determination that the resolution does not survive a committee markup vote, the method 1000 continues to step 1040.

At step 1026, the example system determines whether an amendment to the resolution passes. The resolution can be the subject of one or more amendments proposed, and the system can obtain indications with respect to each individual amendment. Each of the amendments to the resolution can be brought to a vote, and the system can obtain an indication of the result of the vote, and any additional parameters associated therewith. In accordance with a determination that an amendment to the resolution passes, the method 1000 continues to step 1030. In accordance with a determination that an amendment to the resolution does not pass, the method 1000 continues to step 1040.

At step 1030, the example system determines whether the resolution becomes law. The resolution can be brought to a floor vote, and the system can obtain an indication of the result of the vote, and any additional parameters associated therewith. The resolution can be brought to executive signature, and the system can obtain an indication of whether the executive has signed, and any additional parameters associated therewith. If the executive has not signed, or has vetoed, the resolution can be brought to a floor override vote, and the system can obtain an indication of the result of the vote, and any additional parameters associated therewith. In accordance with a determination that the resolution becomes law, the method 1000 continues to step 1050. In accordance with a determination that the resolution does not become law, the method 1000 continues to step 1040.

At step 1040, the example system converts the failed resolution to an issue. Based on constituent interaction, the failed resolution can be polled again. As one example, the failed resolution can be polled six months, or every six months, after the failure of the resolution. In some implementations, the method 1000 ends at step 1040.

At step 1050, the example system converts the resolution to a law. When a bill is passed, constituent responses associated with the final version of the resolution can become composite scores for the law, and can be compared to the representative's final vote. The composite scores can be structured as a binary support metric, indicating a "Yes" or "No" support level for the particular portion of the law. Corresponding composite scores and binary metrics can be obtained and stored for resolutions that fail. The system can transmit one or more surveys based on the passed resolution after passage. As one example, the law resulting from the passed resolution can be polled by transmitting the feedback objects associated with the survey corresponding to the passed legislation. The feedback objects can be transmitted periodically to gauge popularity and accuracy of intended consequences and unintended consequences. The period can be approximately six months, for example. In some implementations, the method 1000 ends at step 1050.

Figure 11:
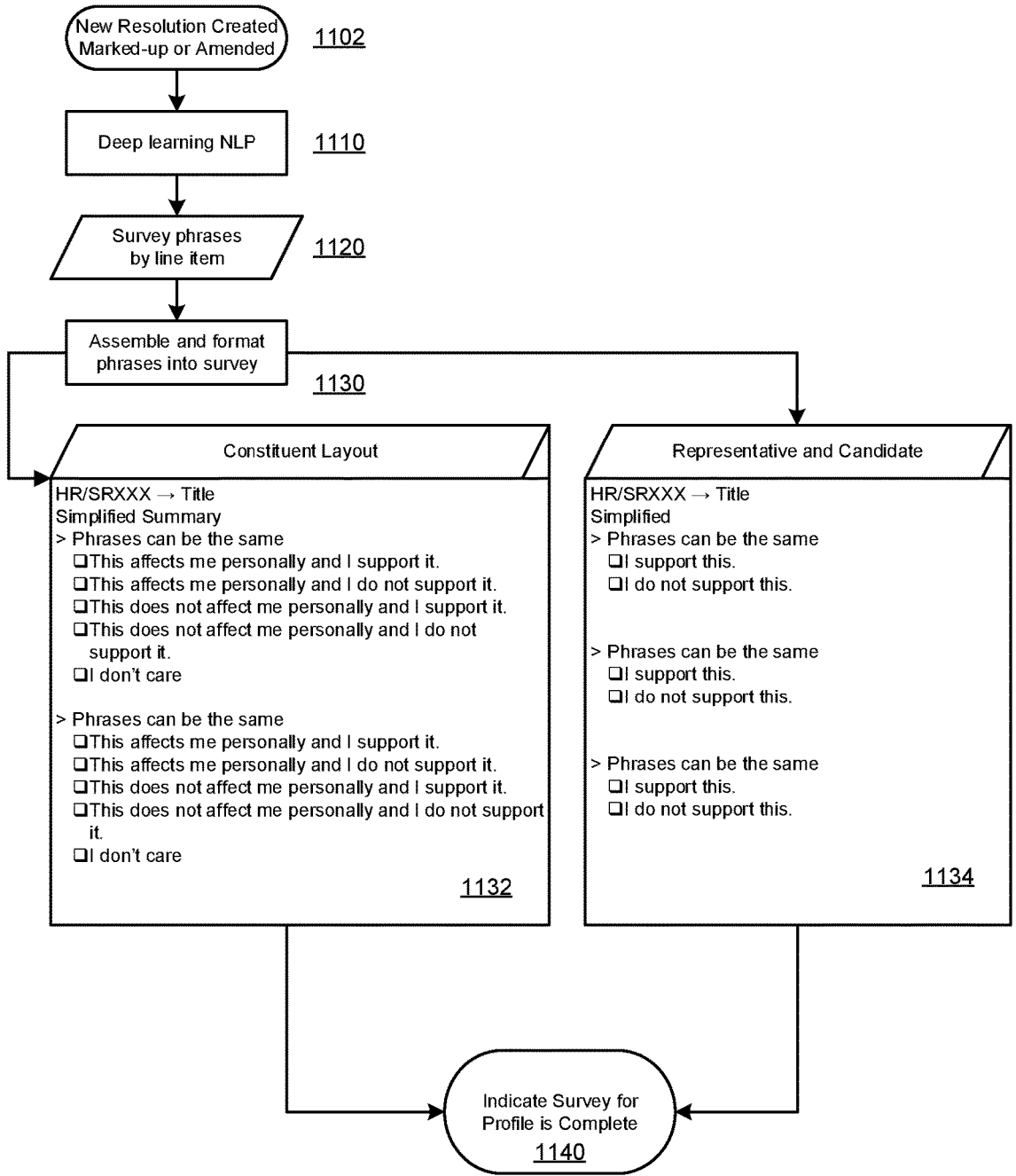
FIG. 11 illustrates an example machine learning feedback system architecture, in accordance with present implementations.

FIG. 11 illustrates an example machine learning feedback system architecture, in accordance with present implementations. In some implementations, the system 100 performs method 1100 according to present implementations. In some implementations, the method 1100 begins at step 1102. At step 1102, the example system obtains a new resolution. The system can create the resolution in response to receiving an indication of a new introduction of the resolution in a legislative body or a state change of the resolution. The state change of the resolution can include, but is not limited to, markup. The method 1100 then continues to step 1110. At step 1110, the example system generates one or more outputs in response to one or more supervised or unsupervised machine learning systems. The system can generate according to step 1010 in accordance with the structure and operation of at least a portion of the architecture 200. The method 1100 then continues to step 1120.

At step 1120, the example system generates survey phrases by line item. The system can generates phrases in accordance with operation of one or more of the text frame identifier 212, the context identifier 214, the text condenser 220 and the feedback text generator 230. Phrases can be coded to at least one section number in the resolution. The coding can be presented, optionally to a user of the system. As one example, coding can be presented by a user interface to representatives or candidates, in response to a selection at the remote device thereof. The method 1100 then continues to step 1130.

At step 1130, the example system assembles and formats one or more phrases into a survey. The system can assemble and format in accordance with operation of one or more of the text frame identifier 212, the context identifier 214, the text condenser 220 and the feedback text generator 230. The survey can include one or more of an identifier survey, a resolution survey, and a polling survey, for example. In some implementations, step 1130 includes at least one of steps 1132 and 1134. At step 1132, the example system generates a constituent layout. At step 1134, the example system generates a representative and candidate layout. The constituent layout and the representative layout can correspond to the structure of a condensed text object as discussed above. The method 1100 then continues to step 1140. At step 1140, the example system indicates that the survey for the profile is complete. The system can save one or more response of the survey to the profile of the constituent, representative, or candidate. In some implementations, the method 1100 ends at step 1140.

Figure 12:
FIG. 12 illustrates an example comparative match dashboard user interface executable on a remote device, in accordance with present implementations.

FIG. 12 illustrates an example comparative match dashboard user interface executable on a remote device, in accordance with present implementations. As illustrated by way of example in FIG. 12, an example user interface 1200 includes an aggregate match presentation portion 1210, a candidate response metrics presentation portion 1220, and a constituent response metrics presentation portion 1230.

The aggregate match presentation portion 1210 includes a user interface portion presenting at least one metric indicating a quantitative match between a candidate or representative and an individual constituent thereof. The survey presentation portion 810 can include one or more badges indicating agreement with the candidate's constituency satisfying a particular agreement threshold, with respect to one or more particular pieces of legislation or laws and the corresponding feedback objects associated therewith. The aggregate match presentation portion 1210 can include a constituent composite scores for new resolutions, and can represent a percentage of active resolutions or passed legislation, for example, on which the representative or candidate and the constituent satisfy a predetermined agreement threshold as discussed above.

The candidate response metrics presentation portion 1220 includes a user interface portion presenting at least one metric indicating a quantitative agreement threshold level between a candidate or representative and legislative resolution or law, for example. The candidate response metrics presentation portion 1220 can include one or more badges indicating agreement with the candidate satisfying a particular agreement threshold, with respect to one or more particular pieces of legislation or laws and the corresponding feedback objects associated therewith. As one example, the badge can include a "checkmark" object corresponding to an agreement metric between the representative or candidate and the resolution or law, satisfying the agreement threshold, and a "crossout" object corresponding to an agreement metric between the representative or candidate and the resolution or law, not satisfying the agreement threshold.

The constituent response metrics presentation portion 1230 threshold level includes a user interface portion presenting at least one metric indicating a quantitative agreement threshold level between a constituent and legislative resolution or law, for example. The constituent response metrics presentation portion 1230 can include one or more badges indicating agreement with the constituent satisfying a particular agreement threshold, with respect to one or more particular pieces of legislation or laws and the corresponding feedback objects associated therewith. As one example, the badge can include a "checkmark" object corresponding to an agreement metric between the constituent and the resolution or law, satisfying the agreement threshold, and a "crossout" object corresponding to an agreement metric between the constituent and the resolution or law, not satisfying the agreement threshold. The match can be based on, for example, a correspondence between responses to a particular feedback object, or between responses associated with a particular text fragment phrase, or the like.

Figure 13:
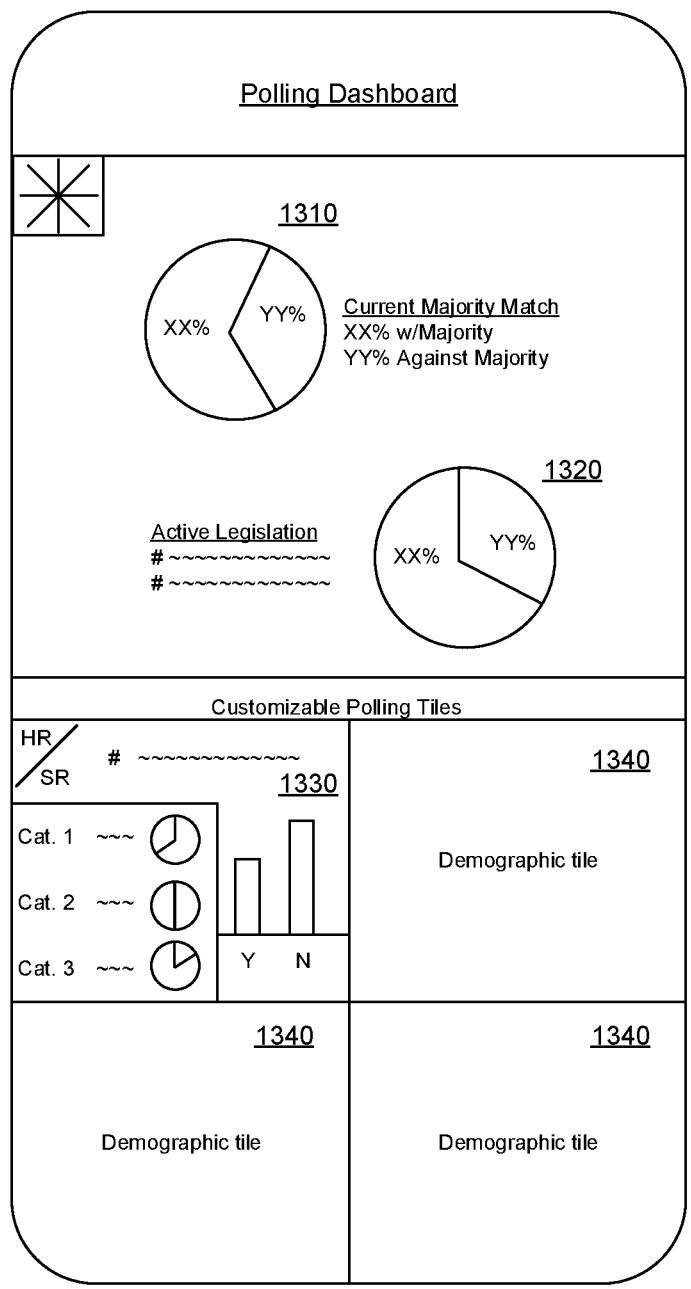
FIG. 13 illustrates an example distributed polling communication architecture, in accordance with present implementations.

FIG. 13 illustrates an example distributed polling communication user interface, in accordance with present implementations. As illustrated by way of example in FIG. 13, an example user interface 1300 includes a current aggregate match presentation portion 1310, an active legislation aggregate match presentation portion 1320, a detail match presentation portion 1330, and one or more expended tile presentation portions 1340. The user interface 1300 can be activated accessed by clicking or touching, for example, the polling presentation portion 760.

The current aggregate match presentation portion 1310 includes a user interface portion presenting at least one metric indicating a quantitative agreement presentation associated with a constituent group. The constituent composite scores can be based on an aggregate agreement with the majority position on one or more feedback objects, resolutions, laws, and the like. As one example, the user interface can present majority support in accordance with a majority support threshold of 60%. The current aggregate match presentation portion 1310 can be based on all active and passed legislation, for example. The user interface portion can include a pie chart presentation indicating an aggregate percentage match with the majority of constituents in one or more jurisdictions. The active legislation aggregate match presentation portion 1320 includes a user interface portion presenting at least one metric indicating a quantitative agreement presentation associated with a constituent group. The current aggregate match presentation portion 1310 can be based on all active legislation, for example, and can correspond to the current aggregate match presentation portion 1310 in at least one or more of structure and operation.

The detail match presentation portion 1330 includes a user interface portion presenting at least one metric indicating a quantitative agreement presentation associated with a constituent group. The detail match presentation portion 1330 can include one or more pie chart presentations or bar chart presentations, for example, generated based on metrics associated with one or more pieces of legislation or one or more jurisdictions. As one example, the detail match presentation portion 1330 can present one or more pie chart presentations including support levels by category with respect to a piece of legislation. The category can include, but is not limited to, a geographic, demographic or socioeconomic category. The category presentations can be subsets of support metrics of an aggregate presentation with respect to a particular piece of legislation. The overall support metrics can be presented in the bar chart or another visualization.

The expanded tile presentation portions 1340 includes a user interface portion available to present any user interface. As one example, the constituent can select the expanded tile presentation portions 1340 to generate a further active legislation presentation portion directed to a jurisdiction, issue or group of issues, demographic or group of demographics, or interest or group of interests different from that or those presented at the detail match presentation portion 1330. The expanded tile presentation portions 1340 can each independently display content.

Figure 14:
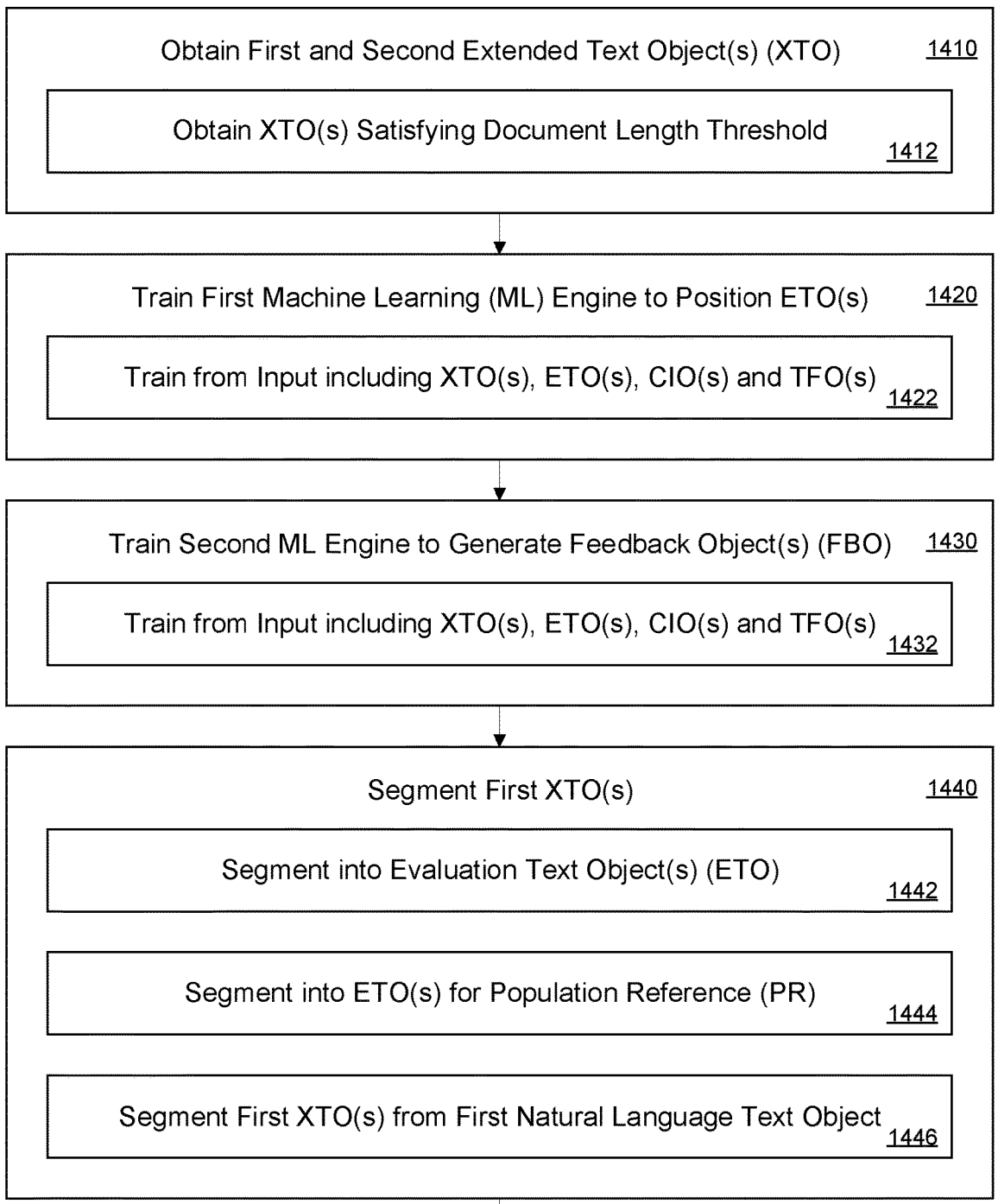
FIG. 14 illustrates an example generating and obtaining remote classification of condensed large-scale text objects, in accordance with present implementations.

FIG. 14 illustrates an example generating and obtaining remote classification of condensed large-scale text objects, in accordance with present implementations. In some implementations, at least one of the example system 100 and the example device 200 performs method 1400 according to present implementations. In some implementations, the method 1400 begins at step 1410.

At step 1410, the example system obtains first and second extended text objects. Step 1410 can include step 1412. At step 1412, the example system obtains first and second extended text objects, where at least one extended text object satisfies a document length threshold. A document length threshold can include a word count, character count or any metric based thereon. As one example, a document length threshold can be a page count exceeding 10 pages, 100, pages, or 1000 pages. As another example, a document length threshold can be an estimate time required to read a document fully, in hours, months, years, decades, or longer. The method 1400 then continues to step 1420.

At step 1420, the example system trains a first machine learning engine to position extended text objects. In some implementations, the first machine learning engine corresponds at least partially to the supervised machine learning system 320. Step 1420 can include step 1422. At step 1422, the example system trains a first machine learning engine from input including or based on one or more of an extended text object, an evaluation text object, a context identifier object, and a text frame object. The method 1400 then continues to step 1430.

At step 1430, the example system trains a second machine learning engine to generate at least one feedback object. Step 1430 can include step 1432. At step 1432, the example system trains a second machine learning system from input including or based on one or more of an extended text object, an evaluation text object, a context identifier object, and a text frame object. The method 1400 then continues to step 1440.

At step 1440, the example system segments at least one first extended text object. The system can segment the extended text object into at least one text fragment. Step 1440 can include at least one of steps 1442, 1444 and 1446. At step 1442, the example system segments the extended text object into one or more evaluation text objects. At step 1444, the example system segments the extended text object based on a population reference. The population reference can include one or more characteristics associated with a particular physical unit, geographic unit, political unit, or demographic unit, for example. The system can filter the extended text objects or generate text objects based on one or more characteristics of the population reference, for example. At step 1446, the example system segments the extended text object from a first natural language text object. The first natural language text object can include a text document written in any human language, and can include narrative text, legal text, legislative text, or unstructured human-language text, for example. The method 1400 then continues to step 1502.

Figure 15:
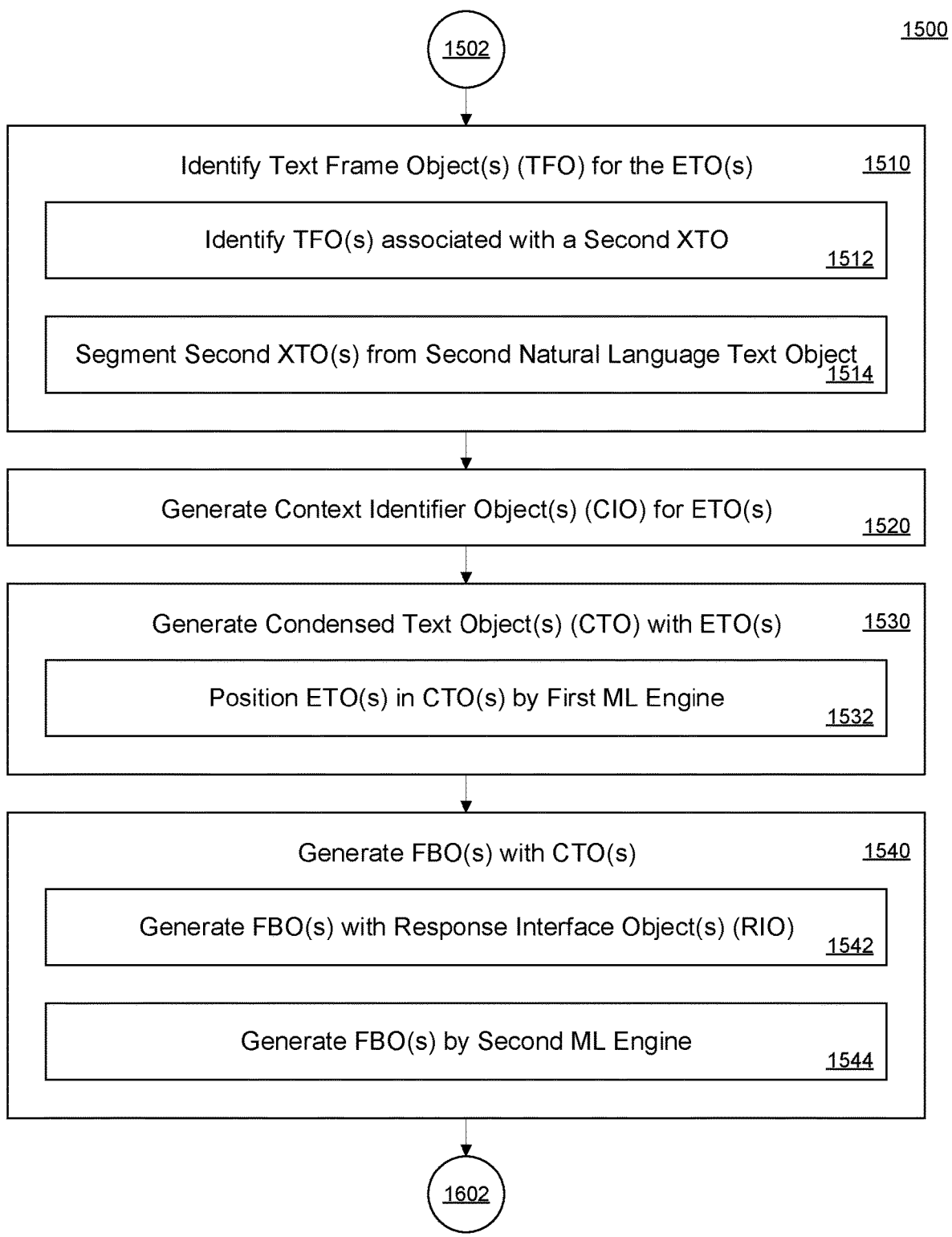
FIG. 15 illustrates an example generating and obtaining remote classification of condensed large-scale text objects further to the example method of FIG. 14.

FIG. 15 illustrates an example generating and obtaining remote classification of condensed large-scale text objects further to the example method of FIG. 14. In some implementations, at least one of the example system 100 and the example device 200 performs method 1500 according to present implementations. In some implementations, the method 1500 begins at step 1502. The method 1500 then continues to step 1510.

At step 1510, the example system identifies at least one text frame object. A text frame object can include a block of natural language text including an evaluation text object, or a term associated therewith. A term associated with an evaluation text object can include a synonym thereof, or a word or phrase linked to the evaluation text object by pointer or table. Step 1510 can include at least one of steps 1512 and 1514. At step 1512, the example system identifies at least one text frame object associated with a second extended text object. The second extended text object can be a natural language text referencing, sharing common subject matter with, or derived from the first extended text object, for example. At step 1514, the example system segments the second extended text object from a second natural language text object. The second natural language text object can include a text document written in any human language, and can include narrative text, legal text, legislative text, or unstructured human-language text, for example. The method 1500 then continues to step 1520.

At step 1520, the example system generates at least one context identifier object corresponding to at least one extended text object. The context identifier objects can include tags, metadata, scalar values, or annotations, for example, indicating a semantic property of any text fragment associated therewith. The method 1500 then continues to step 1530.

At step 1530, the example system generates at least one condensed text object based on at least one evaluation text object. The condensed text object can include one or more evaluation text objects, and the evaluation text object can be positioned within the condensed text object based on one or more characteristics of or associated with each respective evaluation text object. The characteristics can include, but are not limited to, any context identifier object associated with the evaluation text object. Step 1530 can include step 1532. At step 1532, the example system positions the evaluation text objects in the condensed text object based on the first machine learning engine. The first machine learning engine can include a first machine learning model operable to generate a condensed text objects including placement of evaluation text objects for constituent, representative, and candidate remote device presentation. The method 1500 then continues to step 1540.

At step 1540, the example system generates one or more feedback objects based on the condensed text objects. Step 1540 can include at least one of steps 1542 and 1544. At step 1542, the example system generates at least one feedback object including a response interface object. The response interface object can include a user interface control affordance. The control affordance can include a check box, radio button, button, dial, slider, or menu, for example. At step 1544, the example system generates the feedback objects by the second machine learning engine. In some implementations, the second machine learning engine corresponds at least partially to the unsupervised machine learning system 340. The method 1500 then continues to step 1602.

Figure 16:
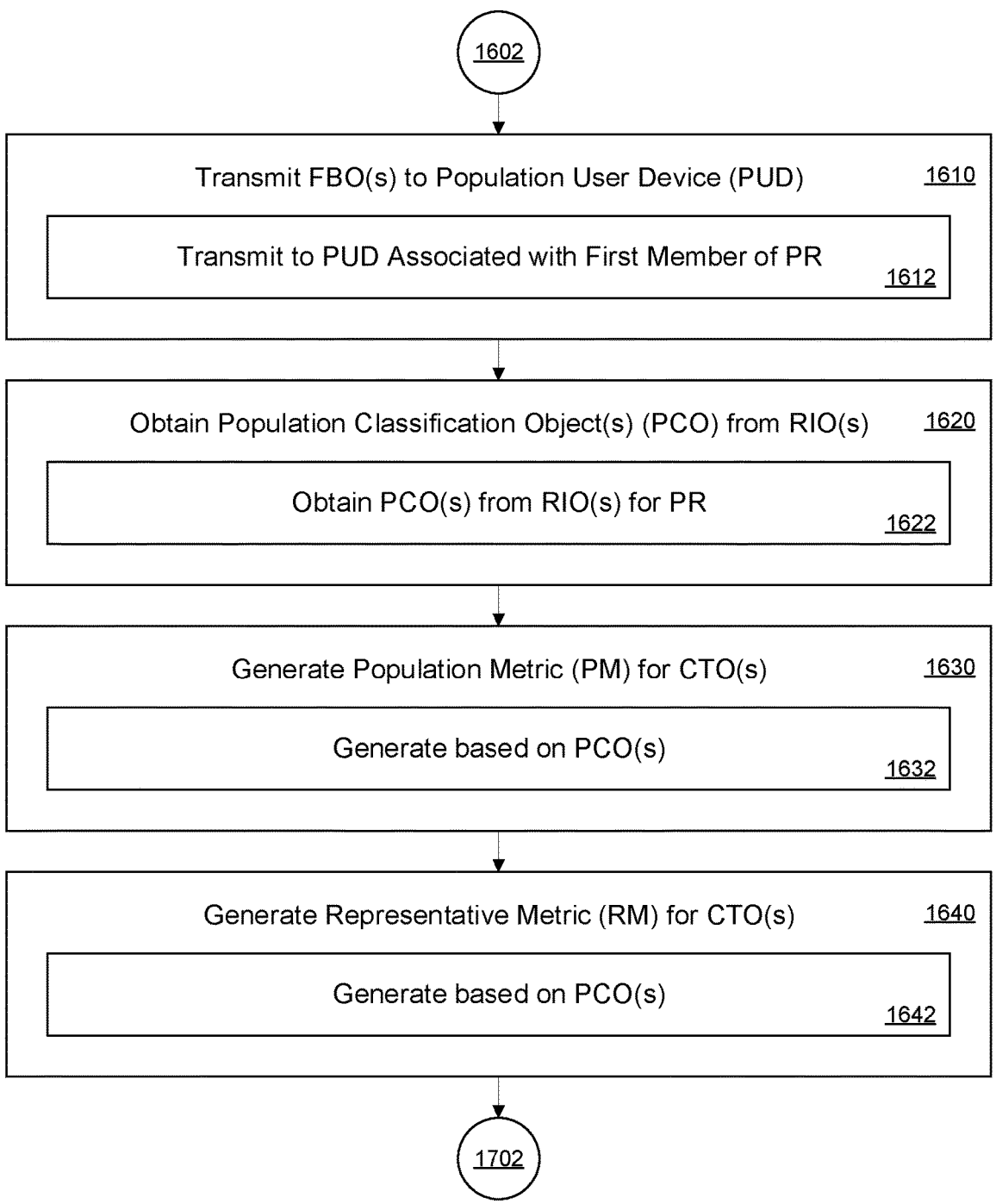
FIG. 16 illustrates an example generating and obtaining remote classification of condensed large-scale text objects further to the example method of FIG. 15.

FIG. 16 illustrates an example generating and obtaining remote classification of condensed large-scale text objects further to the example method of FIG. 15. In some implementations, at least one of the example system 100 and the example device 200 performs method 1600 according to present implementations. In some implementations, the method 1600 begins at step 1602. The method 1600 then continues to step 1610.

At step 1610, the example system transmits the feedback objects to a population user device. The population user device can include a remote device associated with one or more of a constituent, representative, and candidate. The system can transmit the feedback objects by a particular network connection and by a particular API between a mobile application of the population user device and a server or the like of the system. Step 1610 can include step 1612. At step 1612, the example system transmits the feedback objects to a population user device associated with a first member of the population reference. The first member can include an individual constituent, representative, or candidate associated with a population reference. For example, the first member can be a constituent of a particular congressional district. The method 1600 then continues to step 1620.

At step 1620, the example system obtains at least one population classification object from the response interface object. The population classification object can be associated with a user interface control affordance, and can be associated with a response to a query obtained by the control affordance. As one example, the population classification object can include a selection of a check box or a radio button. Step 1620 can include step 1622. At step 1622, the example system obtains at least one population classification object from at least one response interface object and associated with at least one population reference. The method 1600 then continues to step 1630.

At step 1630, the example system generates at least one population metric associated with at least one condensed text object. The population metric can include an agreement level or metric, for example, as discussed above. Step 1630 can include step 1632. At step 1632, the example system generates the population metric based on at least on population classification object. The population metric can be associated with a population reference, a category of a population reference, or a group of constituents, to generate the population metric based at least partially on one or more population classification objects. As one example, the population metric can be a number of responses obtained from a plurality of constituents associated with a selection of support corresponding to a population classification object. The method 1600 then continues to step 1640.

At step 1640, the example system generates at least one representative metric corresponding to at least one condensed text object. The representative metric can correspond to a response by a representative or a candidate to a feedback object. Step 1640 can include step 1642. At step 1642, the example system generates the population metric based on at least on population classification object. Step 1642 can correspond at least partially to step 1632. The method 1600 then continues to step 1702.

Figure 17:
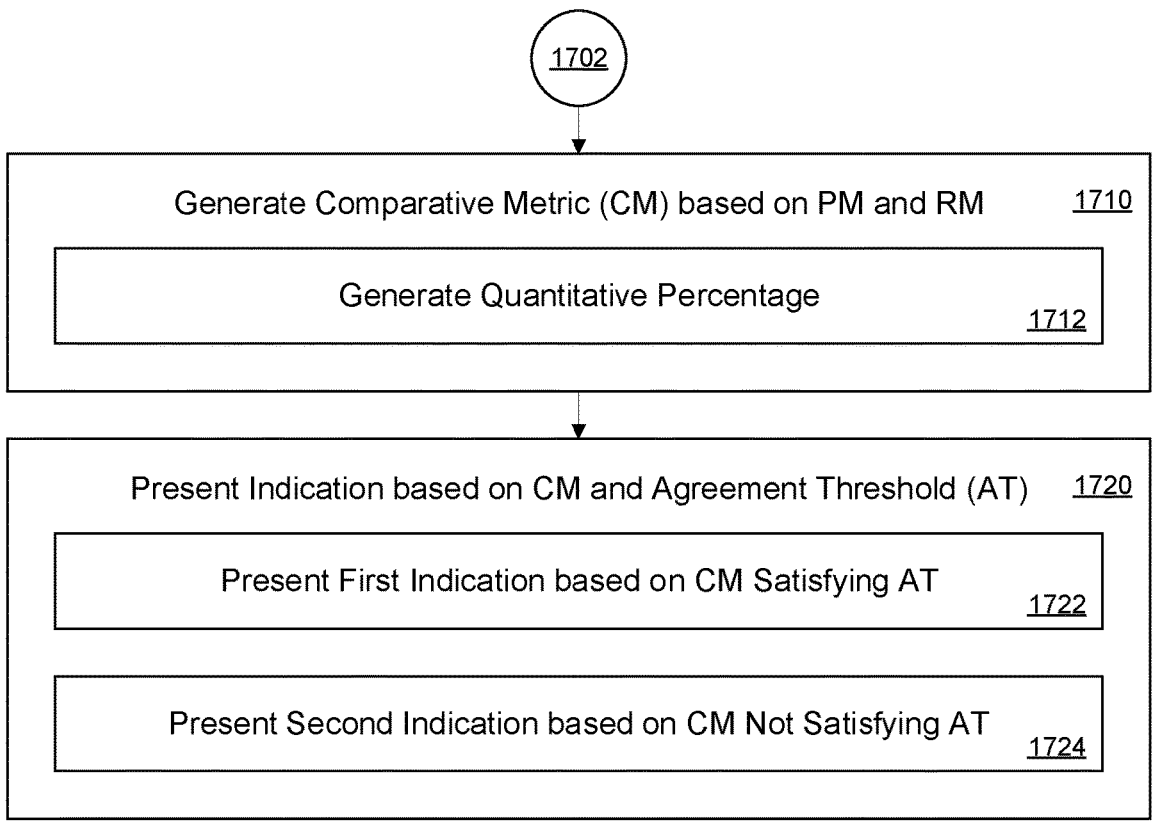
FIG. 17 illustrates an example generating and obtaining remote classification of condensed large-scale text objects further to the example method of FIG. 16.

FIG. 17 illustrates an example generating and obtaining remote classification of condensed large-scale text objects further to the example method of FIG. 16. In some implementations, the example system 100 performs method 1700 according to present implementations. In some implementations, the method 1700 begins at step 1702. The method 1700 then continues to step 1710.

At step 1710, the example system generates at least one comparative metric based on one or more of the population metric and the representative metric. The comparative metric can correspond to the aggregate metric presented in the aggregate match presentation portion 1210. Step 1710 can include step 1712. At step 1712, the example system generates a quantitative percentage. The quantitative percentage can include a scalar real number value. The method 1700 then continues to step 1720.

At step 1720, the example system presents at least one indication based on the comparative metric and an agreement threshold. The presentation can correspond to at least one of the candidate response metrics presentation portion 1220, and the constituent response metrics presentation portion 1230. Step 1720 can include at least one of steps 1722 and 1724. At step 1722, the example system presents a first indication based on a comparative metric satisfying an agreement threshold. The first indication can include, for example, a checkmark image, or icon. At step 1724, the example system presents a second indication based on a comparative metric satisfying an agreement threshold. The second indication can include, for example, an "X" or crossout image, or icon. In some implementations, the method 1700 ends at step 1724.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A system to quantify aggregate alignment of segmented text with an evaluator population, the system comprising:
   a data processing system, comprising memory and one or more processors, configured to:
   obtain, via a first user interface, one or more identifier text objects that describe an individual member in a population reference correlated to members in a jurisdiction, at least one of the one or more identifier text objects relevant to a first extended text object corresponding to legislative text for the jurisdiction, wherein the individual member comprises at least one of a constituent or a representative;
   segment the first extended text object into one or more evaluation text objects that satisfy criteria based on at least one of the one or more identifier text objects;
   identify one or more text frame objects corresponding to the one or more evaluation text objects, the one or more text frame objects being associated with a second extended text object;
   generate, based on the one or more text frame objects, one or more context identifier objects corresponding to the one or more evaluation text objects;
   generate a condensed text object including at least one of the one or more evaluation text objects, the at least one evaluation text object being positioned in the condensed text object in response to output of a first machine learning model trained with input including at least one of the first extended text object, the evaluation text objects, the one or more context identifier objects, and the one or more text frame objects;
   generate a feedback object including the condensed text object and at least one response interface object;
   determine a constituent population metric by:
      transmitting, to a constituent user device associated with a first member of the population reference, the feedback object including the condensed text object and the at least one response interface object;
      causing, at the constituent user device, a second user interface to present the feedback object including the condensed text object and the at least one response interface object;
      obtaining, from the constituent user device, one or more population classification objects from the at least one response interface object; and
      generating the constituent population metric associated with the condensed text object and based on the one or more population classification objects;
   determine a representative metric by:
      transmitting to a representative user device associated with a second member of the population reference, the feedback object including the condensed text object and the at least one response interface object, wherein the second member was previously verified by the processor as a candidate or a representative for the jurisdiction and the second member is different from the first member;
      causing, at the representative user device, a third user interface to present the feedback object including the condensed text object and the at least one response interface object;
      obtaining, from the representative user device, one or more representative classification objects from the at least one response interface object; and
      generating the representative metric associated with the condensed text object and based on the one or more representative classification objects;
   generate a first comparative metric indicating a quantitative agreement between the constituent population metric and the representative metric; and
   cause, at the constituent user device, a fourth user interface to present the first comparative metric.

2. The system of claim 1, wherein the data processing system is further configured to:
   generate the feedback object corresponding to an output of a second machine learning model trained with input including at least one of the first extended text object, the one or more evaluation text objects, the one or more context identifier objects, and the one or more text frame objects.

3. The system of claim 1, wherein the data processing system is further configured to:
   present, at the representative user device operatively coupled with the data processing system and associated with the second member, and in response to a determination that the first comparative metric satisfies an agreement threshold, an indication that the first comparative metric satisfies the agreement threshold.

4. The system of claim 1, wherein the first extended text object, the second extended text object, and the condensed text object comprise natural language text satisfying a document length threshold.

5. The system of claim 1, comprising the data processing system to:
   in response to a determination that the first comparative metric satisfies an agreement threshold, present an indication in the fourth user interface that the first comparative metric satisfies the agreement threshold.

6. The system of claim 1, wherein the first extended text object, the second extended text object, and the condensed text object each comprise natural language text satisfying respective document length thresholds.

7. A method to quantify aggregate alignment of segmented text with an evaluator population, the method comprising:
obtaining, via a first user interface, one or more identifier text objects that describe an individual member in a population reference correlated to members in a jurisdiction, at least one of the one or more identifier text objects relevant to a first extended text object corresponding to legislative text for the jurisdiction, wherein the individual member comprises at least one of a constituent or a representative;
segmenting, by a data processing system comprising one or more processors, the first extended text object into one or more evaluation text objects that satisfy criteria based on at least one of the one or more identifier text objects;
identifying, by the data processing system, one or more text frame objects corresponding to the one or more evaluation text objects, the one or more text frame objects being associated with a second extended text object;
generating, by the data processing system and based on one or more text frame objects, one or more context identifier objects corresponding to the one or more evaluation text objects;
generating, by the data processing system, a condensed text object including at least one of the one or more evaluation text objects, the at least one evaluation text object being positioned in the condensed text object in response to output of a first machine learning model trained with input including at least one of the first extended text object, the evaluation text objects, the one or more context identifier objects, and the one or more text frame objects;
generate a feedback object including the condensed text object and at least one response interface object;
determine a constituent population metric by:
transmitting, to a constituent user device associated with a first member of the population reference, the feedback object including the condensed text object and the at least one response interface object;
causing, at the constituent user device, a second user interface to present the feedback object including the condensed text object and the at least one response interface object;
obtaining, from the constituent user device, one or more population classification objects from the at least one response interface object; and
generating the constituent population metric associated with the condensed text object and based on the one or more population classification objects;
determine a representative metric by:
transmitting to a representative user device associated with a second member of the population reference, the feedback object including the condensed text object and the at least one response interface object, wherein the second member was previously verified by the processor as a candidate or a representative for the jurisdiction and the second member is different from the first member;
causing, at the representative user device, a third user interface to present the feedback object including the condensed text object and the at least one response interface object;
obtaining, from the representative user device, one or more representative classification objects from the at least one response interface object; and
generating the representative metric associated with the condensed text object and based on the one or more representative classification objects;
generating a first comparative metric indicating a quantitative agreement between the constituent population metric and the representative metric; and
causing, at the constituent user device, a fourth user interface to present the first comparative metric.

8. The method of claim 7, further comprising:
generating, by the data processing system, the feedback object corresponding to an output of a second machine learning model trained with input including at least one of the first extended text object, the one or more evaluation text objects, the one or more context identifier objects, and the one or more text frame objects.

9. The method of claim 8, further comprising:
executing, by the data processing system, at least one instruction to present, at the representative user device operatively coupled with the data processing system and associated with the second member, and in response to a determination that the first comparative metric satisfies an agreement threshold, an indication that the first comparative metric satisfies the agreement threshold.

10. The method of claim 9, wherein the first extended text object, the second extended text object, and the condensed text object comprise natural language text satisfying a document length threshold.

11. The method of claim 7, comprising:
in response to a determination that the first comparative metric satisfies an agreement threshold, presenting, by the data processing system, an indication in the fourth user interface that the first comparative metric satisfies the agreement threshold.

12. The method of claim 7, wherein the first extended text object, the second extended text object, and the condensed text object each comprise natural language text satisfying respective document length thresholds.

13. A non-transitory computer readable medium including one or more instructions stored thereon and executable by a processor to:
obtain, via a first user interface of a population user device operatively coupled with the processor, one or more identifier text objects that describe an individual member in a population reference correlated to members in a jurisdiction, at least one of the one or more identifier text objects relevant to a first extended text object corresponding to legislative text for the jurisdiction, wherein the individual member comprises at least one of a constituent or a representative;
segment the first extended text object into one or more evaluation text objects that satisfy criteria based on at least one of the one or more identifier text objects;
identify one or more text frame objects corresponding to the evaluation text objects, the text frame objects being associated with a second extended text object;
generate, based on the text frame objects, one or more context identifier objects corresponding to the evaluation text objects;

generate a condensed text object including at least one of the one or more evaluation text objects, the at least one evaluation text object being positioned in the condensed text object in response to output of a first machine learning model trained with input including at least one of the first extended text object, the evaluation text objects, the context identifier objects, and the text frame objects;

generate a feedback object including the condensed text object and at least one response interface object;

determine a constituent population metric by:
  transmitting, to a constituent user device associated with a first member of the population reference, the feedback object including the condensed text object and the at least one response interface object;
  causing, at the constituent user device, a second user interface to present the feedback object including the condensed text object and the at least one response interface object;
  obtaining, from the constituent user device, one or more population classification objects from the at least one response interface object; and
  generating, the constituent population metric associated with the condensed text object and based on the one or more population classification objects;

determine a representative metric by:
  transmitting to a representative user device associated with a second member of the population reference, the feedback object including the condensed text object and the at least one response interface object, wherein the second member was previously verified by the processor as a candidate or a representative for the jurisdiction and the second member is different from the first member;
  causing, at the representative user device, a third user interface to present the feedback object including the condensed text object and the at least one response interface object;
  obtaining, from the representative user device, one or more representative classification objects from the at least one response interface object; and
  generating the representative metric associated with the condensed text object and based on the one or more representative classification objects;

generate a first comparative metric indicating a quantitative agreement between the constituent population metric and the representative metric; and cause, at the constituent user device, a fourth user interface to present the first comparative metric.

14. The non-transitory computer readable medium of claim 13, wherein the presentation of the first comparative metric in the fourth user interface comprises: in response to a determination that the first comparative metric satisfies an agreement threshold, present an indication that the first comparative metric satisfies the agreement threshold.

15. The non-transitory computer readable medium of claim 13, wherein the first extended text object, the second extended text object, and the condensed text object each comprise natural language text satisfying respective document length thresholds.

* * * * *